(12) United States Patent
Stefani et al.

(10) Patent No.: US 11,170,309 B1
(45) Date of Patent: Nov. 9, 2021

(54) SYSTEM FOR ROUTING MACHINE LEARNING MODEL INFERENCES

(71) Applicant: Amazon Technologies, Inc., Seattle, WA (US)

(72) Inventors: Stefano Stefani, Issaquah, WA (US); Leo Parker Dirac, Seattle, WA (US); Taylor Goodhart, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1023 days.

(21) Appl. No.: 15/821,564

(22) Filed: Nov. 22, 2017

(51) Int. Cl.
*G06N 5/04* (2006.01)
*H04L 29/06* (2006.01)
*H04L 12/24* (2006.01)
*G06N 20/00* (2019.01)

(52) U.S. Cl.
CPC ............ *G06N 5/046* (2013.01); *G06N 20/00* (2019.01); *H04L 41/16* (2013.01); *H04L 63/0428* (2013.01)

(58) Field of Classification Search
CPC ........ G06N 3/084; G06N 5/046; H04L 41/16; H04L 63/0428
See application file for complete search history.

(56) References Cited

U.S. PATENT DOCUMENTS

| 8,311,967 | B1 | 11/2012 | Lin et al. | |
| 10,228,959 | B1* | 3/2019 | Anderson | G06F 9/4856 |
| 10,275,710 | B1* | 4/2019 | Teredesai | G06N 3/08 |
| 2016/0210175 | A1* | 7/2016 | Morimura | G06F 9/5077 |
| 2017/0213213 | A1* | 7/2017 | Tomlinson, Jr. | G06Q 20/3227 |
| 2017/0220949 | A1 | 8/2017 | Feng et al. | |
| 2019/0102700 | A1* | 4/2019 | Babu | G06N 5/025 |
| 2020/0219028 | A1* | 7/2020 | Papaemmanouil | G06F 9/45558 |

FOREIGN PATENT DOCUMENTS

| JP | 2017-520068 | 7/2017 |
| JP | 2017-524183 | 8/2017 |
| WO | WO 2016/053950 | 4/2016 |

OTHER PUBLICATIONS

Graepel, Thore, Kristin Lauter, and Michael Naehrig. "ML confidential: Machine learning on encrypted data." International Conference on Information Security and Cryptology. Springer, Berlin, Heidelberg, 2012. (Year: 2012).*

(Continued)

*Primary Examiner* — Hal Schnee
(74) *Attorney, Agent, or Firm* — Knobbe Martens Olson & Bear LLP

(57) ABSTRACT

A machine learning model inference routing system in a machine learning service is described herein. The machine learning model inference routing system includes load balancer(s), network traffic router(s), an endpoint registry, and a feedback processing system that collectively allow the machine learning model inference routing system to adjust the routing of inferences based on machine learning model accuracy, demand, and/or the like. In addition, the arrangement of components in the machine learning model inference routing system enables the machine learning service to perform shadow testing, support ensemble machine learning models, and/or improve existing machine learning models using feedback data.

20 Claims, 11 Drawing Sheets

(56) References Cited

OTHER PUBLICATIONS

Wendell, Patrick, et al. "Donar: decentralized server selection for cloud services." Proceedings of the ACM SIGCOMM 2010 conference. 2010. (Year: 2010).*

International Search Report and Written Opinion for International Application No. PCT/US2018/062064, dated Feb. 20, 2019.

* cited by examiner

SYSTEM FOR ROUTING MACHINE LEARNING MODEL INFERENCES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
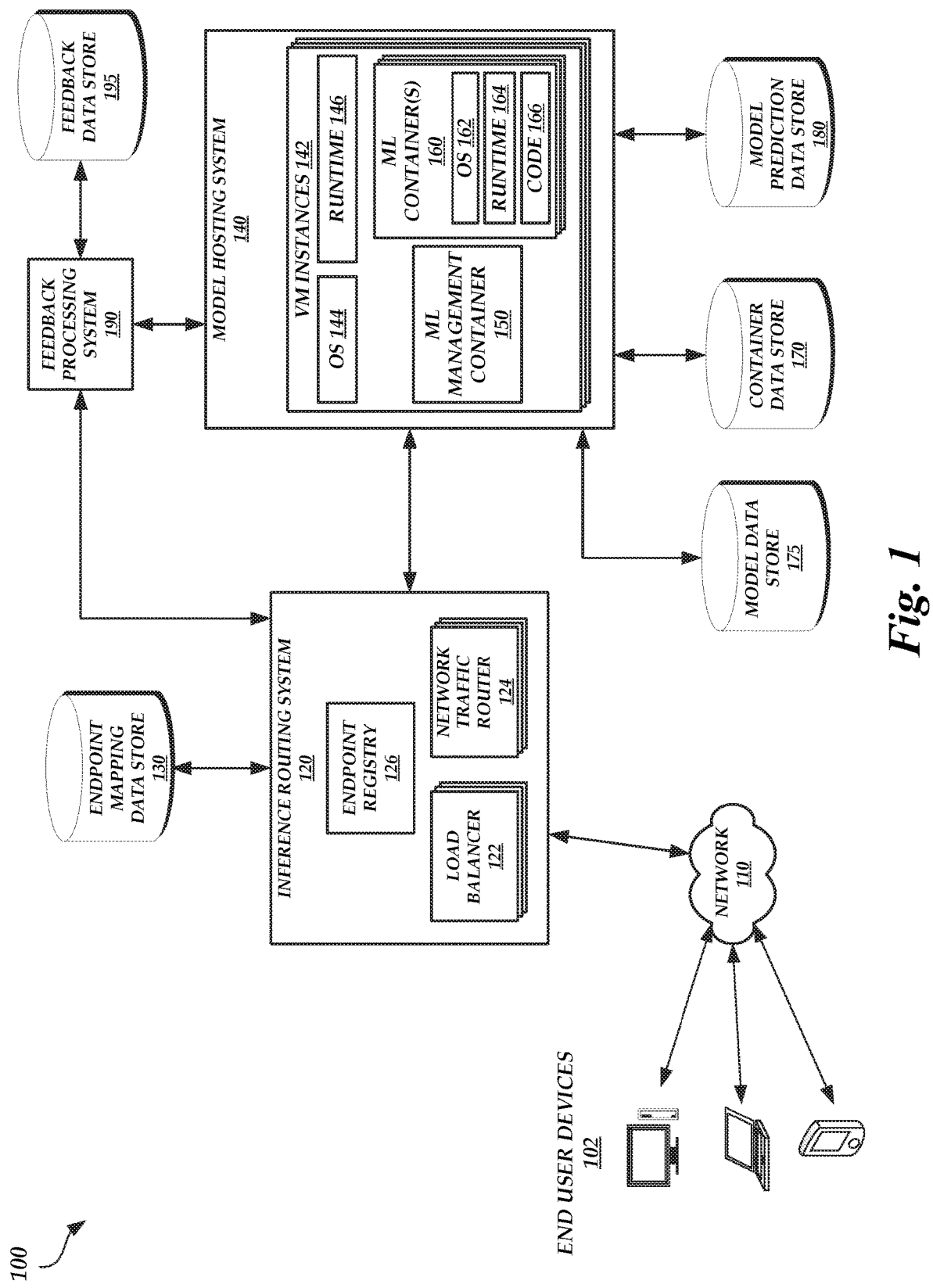
FIG. 1 is a block diagram of an illustrative operating environment in which machine learning model inferences are routed between one or more user devices and one or more virtual machine instances via a network, in some embodiments.

As described above, embodiments enable a single physical computing device (or multiple physical computing devices) to host one or more instances of virtual machines that appear and operate as independent computing devices to users. In some embodiments, a service provider can leverage virtualization technologies to provide a network-accessible machine learning service. For example, the service provider can operate one or more physical computing devices accessible to user devices via a network. These physical computing device(s) can host virtual machine instances that are configured to train and/or execute machine learning models in response to commands received from user devices.

As an illustrative example, a first physical computing device hosts a first virtual machine instance, where the first virtual machine instance executes a first machine learning model. A user device can transmit an inference (e.g., a call to a machine learning model that includes input data) to the first physical computing device. The first virtual machine instance hosted by the first physical computing device can extract input data included in the inference and apply the input data as an input to the first machine learning model (e.g., execute the first machine learning model) to generate a prediction. The first virtual machine instance, via the first physical computing device, can then transmit the prediction to the user device.

In some embodiments, the machine learning service includes a large and variable number of provisioned virtual machine instances. For example, individual users are associated with and control one or more virtual machine instances. A user can instruct the service provider to provision computing resources for creating a new virtual machine instance that hosts a trained machine learning model. A user can also instruct the service provider to delete a virtual machine instance associated with the user. In some embodiments, a large number of users access the machine learning service, resulting in a large number of provisioned virtual machine instances.

Given the large and variable number of provisioned virtual machine instances, the service provider may desire to route network traffic directed to and/or from the virtual machine instances in a manner that is secure and that reduces the load on any one virtual machine instance. In addition, the service provider may desire to dynamically adjust the routing of network traffic to one or more virtual machine instances based on the accuracy and/or performance of the machine learning models executed therein.

In some embodiments, conventional load balancers are provisioned between user devices and virtual machine instances to route the network traffic. For example, one or more virtual machine instances can execute related machine learning models and are grouped accordingly. Each conventional load balancer can be associated with a different group of virtual machine instances to control the routing of inferences to the virtual machine instances in the associated group. For example, a conventional load balancer can be configured with a fixed inference distribution ratio to manage the distribution of inferences to the different virtual machine instances in the associated group. As an illustrative example, the fixed inference distribution ratio causes a conventional load balancer to transmit X percent of inferences to a first virtual machine instance in a first group, Y percent of inferences to a second virtual machine instance in the first group, and so on.

However, the fixed inference distribution ratio of the conventional load balancer can be problematic. For example, in some embodiments, certain machine learning models executed by virtual machine instances in a group turn out to be more accurate than other machine learning models executed by virtual machine instances in the group. The fixed inference distribution ratio, though, may be set such that more inferences are routed to the less accurate machine learning models. In some embodiments, the demand for certain machine learning models executed by virtual machine instances in a group is expected to increase over time. The fixed inference distribution ratio, though, may be set such that more inferences will be routed to the less popular machine learning models. Conventional load balancers provide no mechanism for adjusting the inference distribution ratio based on machine learning model accuracy, performance, demand, and/or the like.

Accordingly, in some embodiments, an efficient machine learning model inference routing system in a machine learning service is described herein. The embodiments described herein include load balancer(s), network traffic router(s), an endpoint registry, and a feedback processing system that collectively allow the embodiments described herein to adjust the routing of inferences based on machine learning model accuracy, performance, demand, and/or the like. In addition, the arrangement of components in the embodiments described herein enables the performance of shadow testing, supports ensemble machine learning models, and improves existing machine learning models using feedback data. Additional details of the embodiments described herein are described below.

Example Machine Learning Model Inference Routing Environment

FIG. 1 is a block diagram of an illustrative operating environment 100 in which machine learning model inferences are routed between one or more user devices 102 and one or more virtual machine instances 142 via a network 110, in some embodiments. The operating environment 100 includes an inference routing system 120, an endpoint mapping data store 130, a model hosting system 140, a container data store 170, a model data store 175, a model prediction data store 180, a feedback processing system 190, and a feedback data store 195.

Example Model Hosting System

In some embodiments, users, by way of user devices 102, may interact with the model hosting system 140 to provide machine learning model inferences, and the model hosting system 140 can use the inferences to execute machine learning models and generate results. For example, the model hosting system 140 can execute machine learning models using one or more pre-established virtual machine instances 142. In particular, the model hosting system 140 includes a single physical computing device or multiple physical computing devices that are interconnected using one or more computing networks (not shown), where the physical computing device(s) host one or more virtual machine instances 142. The model hosting system 140 can handle the acquisition and configuration of compute capacity (e.g., containers, instances, etc., which are described in greater detail below) based on received inferences, and execute machine learning models using the compute capacity. The model hosting system 140 can automatically scale up and down based on the volume of inferences, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 142 are utilized to execute tasks. For example, such tasks can include running a machine learning model to generate a result. As shown in FIG. 1, each virtual machine instance 142 includes an operating system (OS) 144, a language runtime 146, a machine learning (ML) management container 150, and one or more ML containers 160. Generally, the containers 150 and 160 are logical units created within a virtual machine instance using the resources available on that instance, and can be utilized to isolate execution of a task from other processes (e.g., task executions) occurring in the instance. In some embodiments, the containers 150 and 160 are formed from one or more container images and a top container layer. Each container image further includes one or more image layers, where each image layer represents an executable instruction. Changes made to the containers 150 and 160 (e.g., creation of new files, modification of existing files, deletion of files, etc.) are stored in the top container layer. If a container 150 and/or 160 is deleted, the top container layer is also deleted. However, the container image(s) that form a portion of the deleted container 150 and/or 160 can remain unchanged. The containers 150 and 160 can be implemented, for example, as Linux containers.

For example, container images that are used to form the ML containers 160 can be stored in the container data store 170. A container image can include executable instructions that together represent an algorithm that defines a machine learning model. During the machine learning model training process, the executable instructions are executed, resulting in the generation of model data that includes characteristics of the trained machine learning model (e.g., a number of layers in the machine learning model, hyperparameters of the machine learning model, coefficients of the machine learning model, weights of the machine learning model, etc.). The model data is stored in the model data store 175. In some embodiments, in response to a user request that identifies a particular machine learning model or container image, the model hosting system 140 retrieves a container image corresponding to the user request (e.g., from the container data store 170) and the model data generated as a result of execution of the executable instructions that form the retrieved container image (e.g., from the model data store 175). The model hosting system 140 can then form an ML container 160 using the container image and the model data (e.g., the model data can be stored in the top container layer) and initialize the ML container 160 in a virtual machine instance 142. As described below, each ML container 160 includes code that includes the executable instructions in the container image that represent an algorithm that defines a machine learning model. The executable instructions include input parameters, and the model data provides values for at least some of the input parameters (e.g., coefficient parameters, weight parameters, etc.). Thus, the code in combination with the model data forms a trained machine learning model. The virtual machine instance 142 can then execute the trained machine learning model by executing the code stored within an ML container 160.

In some embodiments, the ML management container 150 can route inferences to any ML container 160 initialized in the same virtual machine instance 142 as the ML management container 150, route inferences to ML management containers 150 initialized in other virtual machine instances 142 in the model hosting system 140 or another system (e.g., a shadow model hosting system 540, as described below), store machine learning model execution results, process machine learning model execution results, provide feedback data to the feedback processing system 190, and/or generate and/or store machine learning model execution metrics. Additional details of the ML management container 150 are described below with respect to FIGS. 2-8.

The ML containers 160 each include individual copies of an OS 162, the runtime 164, and code 166 in some embodiments. The OS 162 and/or the runtime 164 can be defined by one or more executable instructions that form at least a portion of a container image that is used to form the ML container 160 (e.g., the executable instruction(s) in the container image that define the operating system and/or runtime to run in the container formed from the container image). The code 166 includes the executable instructions in the container image that represent an algorithm that defines a machine learning model. The OS 162 and/or runtime 164 are configured to execute the code 166 at the direction of the virtual machine instance 142 in response to reception of an inference. For example, the inference can include input data. The OS 162 and/or runtime 164 can execute the code 166 by applying the input data as an input to the algorithm represented by the executable instructions that form at least a part of the code 166. Execution of the code 166 results in an output or execution result (e.g., a prediction, which can be in the form of a numerical value, text, an image, audio, video, an annotated image, annotated audio, annotated video, and/or any combination thereof). The ML container 160 forwards the execution result to ML management container 150.

In some embodiments, the OS 162 and the runtime 164 are the same as the OS 144 and runtime 146 utilized by the virtual machine instance 142. In some embodiments, the OS 162 and/or the runtime 164 are different than the OS 144 and/or runtime 146 utilized by the virtual machine instance 142.

While not shown in FIG. 1, the ML management container 150 also includes an OS, runtime, and/or code in some embodiments. For example, the code can include computer-executable instructions that cause the ML management container 150 to perform the operations described herein. The OS and runtime can be the same or different as the OS 162, runtime 164, OS 144, and/or runtime 146.

While the virtual machine instances 142 are shown in FIG. 1 as a single grouping of virtual machine instances 142, some embodiments of the present application separate virtual machine instances 142 that are actively assigned to execute tasks from those virtual machine instances 142 that are not actively assigned to execute tasks. For example, those virtual machine instances 142 actively assigned to execute tasks are grouped into an "active pool," while those virtual machine instances 142 not actively assigned to execute tasks are placed within a "warming pool." In some embodiments, those virtual machine instances 142 within the warming pool can be pre-initialized with an operating system, language runtimes, and/or other software required to enable rapid execution of tasks (e.g., rapid execution of machine learning model(s) stored in ML container(s) 160) in response to user requests (e.g., inferences).

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., the inference routing system 120, the feedback processing system 190, etc.). The processing unit can also communicate to and from a memory of a virtual machine instance 142 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Example Inference Routing System

In some embodiments, the inference routing system 120 serves as an interface between user devices 102 and virtual machine instances 142 hosted by the model hosting system 140. For example, the inference routing system 120 receives an inference from a user device 102 via the network 110, identifies one or more virtual machine instances 142 hosted by the model hosting system 140 that correspond with the inference, and routes the inference to the identified virtual machine instance(s) 142.

The inference routing system 120 includes various modules, components, data stores, and/or the like to provide the inference routing functionality. In some embodiments, the inference routing system 120 includes one or more load balancers 122, one or more network traffic routers 124, and an endpoint registry 126. A load balancer 122 can receive an inference from a user device 102 via the network 110, identify a network traffic router 124 that should receive the inference (e.g., based on the current loads on the network traffic routers 124, based on a fixed distribution ratio, etc.), and route the inference to the identified network traffic router 124.

In some embodiments, virtual machine instances 142 have a network address (e.g., an Internet protocol (IP) address and/or a port number). Some or all of the virtual machine instances 142 are also associated with an endpoint (e.g., a hypertext transfer protocol (HTTP) endpoint) that is a symbolic name for the virtual machine instance 142. In some embodiments, users have access to the endpoint name, but not the network address. Rather, the endpoint name is mapped to the network address. Accordingly, an inference transmitted by a user device 102 includes the endpoint name to identify the virtual machine instance 142 to which the inference is directed. The mapping is then used to route the inference to the appropriate network address. In this way, the network address of a virtual machine instance 142 can change without the change affecting a user's ability to access or use the functionality provided by the virtual machine instance 142. If the network address changes, then the endpoint name-network address mapping is updated to reflect the new network address. Thus, a user can use the same endpoint name to access or use a virtual machine instance 142, regardless of whether the network address remains static or changes.

The inference can also be referred to herein as a "transform" in some embodiments. The inference (or transform) is a call to a machine learning model that includes input data, an endpoint name, and a user identifier (e.g., a unique value identifying a user or user device, user credentials, etc.). Given that users have access to the endpoint name and not the network address in some embodiments, the network traffic router 124 is configured to identify the network address of the virtual machine instance 142 referenced by the endpoint name included in the inference such that the inference can be routed to the appropriate virtual machine instance 142. For example, the network traffic router 124 includes a cache that stores endpoint name-network address mappings in some embodiments. Upon receiving an inference, the network traffic router 124 can query the cache to determine whether a mapping corresponding to the endpoint name included in the inference is stored therein. If the corresponding mapping is stored in the cache, the network traffic router 124 can retrieve the mapping from cache, identify the network address that maps to the received endpoint name, and route the inference to the network address. If the corresponding mapping is not stored in the cache, then the network traffic router 124 can transmit a request for the mapping to the endpoint registry 126.

In some embodiments, the request for the mapping includes the user identifier and the endpoint name. Endpoint name-network address mappings are stored in the endpoint mapping data store 130. The endpoint registry 126 uses the user identifier and/or endpoint name to query the endpoint mapping data store 130 for the mapping that includes the endpoint name included in the mapping request. The endpoint mapping data store 130 returns the queried mapping to the endpoint registry 126, and the endpoint registry 126 forwards the retrieved mapping to the network traffic router 124. The network traffic router 124 can then process the retrieved mapping and store the retrieved mapping in cache.

In further embodiments, the endpoint registry 126 manages the accuracy of the endpoint name-network address mappings. For example, if the network address of a virtual machine instance 142 changes, the endpoint registry 126 is notified of the change. The notification can include both the old and new network addresses. In response, the endpoint registry 126 queries the endpoint mapping data store 130 for a mapping associated with the old network address of the virtual machine instance 142. Once retrieved, the endpoint registry 126 updates the mapping to replace the old network address with the new network address and stores the updated mapping in the endpoint mapping data store 130. The endpoint registry 126 can perform additional operations, which are described in greater detail below.

Once the network traffic router 124 retrieves the mapping associated with the received endpoint name, whether from cache or the endpoint registry 126, the network traffic router 124 identifies the network address mapped to the received endpoint name in some embodiments. The network traffic router 124 then transmits the inference to the identified network address, and specifically to the ML management container 150 of the virtual machine instance 142 associated with the identified network address.

As described above, the ML management container 150 can send the inference to the ML container 160 initialized in the same virtual machine instance 142, which causes the ML container 160 to generate an output or execution result. The ML container 160 then sends the execution result to the ML management container 150. In some embodiments, the ML management container 150 stores the execution result in the model prediction data store 180 in an entry associated with the input data that resulted in the execution result and an identification of the virtual machine instance 142 that produced the execution result. In some embodiments, the ML management container 150 transmits the execution result to the user device 102 that transmitted the inference via the inference routing system 120. For example, the ML management container 150 transmits the execution result to the network traffic router 124 along with a user identifier originally included in the inference. The network traffic router 124 can use the user identifier to identify the user device 102 that transmitted the inference that resulted in the execution result, and transmit the execution result to the identified user device 102. In some embodiments, the ML management container 150 transmits the execution result to another virtual machine instance 142 in the model hosting system 140 or another system (e.g., the shadow model hosting system 540), which is described in greater detail below.

In some embodiments, the inference transmitted by a user device 102 is encrypted. For example, the inference can be encrypted using a secure sockets layer (SSL) protocol certificate or a transport layer security (TLS) protocol certificate. The load balancer(s) 122 can be configured to decrypt received inferences prior to identifying network traffic routers 124 that should receive the inferences.

Prior to routing an inference to an identified network traffic router 124, the load balancer 122 re-encrypts the inference in some embodiments. For example, the inference can be re-encrypted using the SSL protocol certificate or the TLS protocol certificate. Similar to the load balancer 122, the network traffic router 124 that receives an encrypted inference can be configured to decrypt the inference prior to identifying a virtual machine instance 142 to which to route the inference.

Once the appropriate virtual machine instance 142 is identified, the network traffic router 124 re-encrypts the inference and transmits the encrypted inference to the network address of the virtual machine instance 124 in some embodiments. The ML management container 150 of the virtual machine instance 124 that receives the encrypted inference can then decrypt the encrypted inference. Unlike the load balancer 122 and the network traffic router 124, the ML management container 150 does not re-encrypt the inference prior to sending the inference to the ML container 160 initialized on the same virtual machine instance 142 as the ML management container 150. Encryption of the inference for a transmission of the inference between the ML management container 150 and the ML container 160 may not be necessary because both containers 150 and 160 run on the same host (e.g., virtual machine instance 142) and thus there is no transmission of the inference over an external network. However, in some embodiments, the ML management container 150 re-encrypts the inference prior to transmission of the inference to another virtual machine instance 142 hosted by the model hosting system 140 and/or another virtual machine instance hosted by another system (e.g., the shadow model hosting system 540).

Using Feedback to Update Machine Learning Models

In some embodiments, the execution result produced by a machine learning model executed by an ML container 160 is a prediction that a certain input will result in a certain output. For example, the execution result can include a prediction that, given certain input, certain user behavior will occur in the future, a specific event will occur in the future, an image includes a specific object, a user uttered a specific word, and/or the like. The feedback data store 195 can store the actual output that resulted from a given input (e.g., as provided by user devices 102 and/or other devices (not shown)) in an entry associated with the input data that resulted in the actual output. Thus, the predicted output and the actual output can be compared to determine the accuracy of a machine learning model and/or to improve the accuracy of a machine learning model.

In particular, the feedback processing system 190 is configured to determine the accuracy of a machine learning model and/or to improve the accuracy of a machine learning model in some embodiments. For example, the feedback processing system 190 can retrieve an execution result from the model prediction data store 180 and/or directly from the ML management container 150 of a virtual machine instance 142. In addition, the feedback processing system 190 can retrieve the input data that resulted in the execution result and the identification of the virtual machine instance 142 that produced the execution result. The feedback processing system 190 can also retrieve the actual output stored in the feedback data store 195 that corresponds with the input data that resulted in the retrieved execution result. The feedback processing system 190 can then compare the actual output with the execution result and generate an error rate that reflects the difference between the actual output and the execution result.

In some embodiments, the feedback processing system 190 transmits the error rate to the endpoint registry 126. The endpoint registry 126 can then use the error rate to adjust the routing of inferences to virtual machine instances 142, as described in greater detail below.

In some embodiments, the feedback processing system 190 can determine whether the error rate exceeds a threshold value. In some embodiments, if the error rate exceeds a threshold value, then the feedback processing system 190 determines one or more modifications to the characteristics of the machine learning model executed by the ML container 160 of the virtual machine instance 142 that produced the execution result associated with the error rate that may result in an improvement to the accuracy of the machine learning model. For example, the feedback processing system 190 can determine a modification to a hyperparameter of the machine learning model, a coefficient of the machine learning model, a weight of the machine learning model, and/or the like. The feedback processing system 190 can transmit the determined modification(s) to the endpoint registry 126. The endpoint registry 126 can automatically update (e.g., tune) the machine learning model according to the determined modification(s) (e.g., by transmitting an instruction to the ML management container 150 of the subject virtual machine instance 142 via the network traffic router 124 to update the code 166 and/or the top container layer in the ML container 160 initialized on the same virtual machine instance 142 as the ML management container 150 according to the determined modification(s)) or can suggest, to the user device 102 that transmitted the inference that resulted in the execution result associated with the error rate, modification(s) to the machine learning model that may improve the accuracy of the machine learning model. In some embodiments, the feedback processing system 190 stores the error rate in the feedback data store 195. In some embodiments, the feedback processing system 190 transmits the error rate to the user device 102 associated with the virtual machine instance 142 that produced the execution result associated with the error rate. Thus, a user operating the user device 102 can monitor the accuracy of the machine learning model executed by the ML container 160 initialized in the virtual machine instance 142 over time.

In some embodiments, the feedback processing system 190 can transmit other quality metrics other than error rate, such as a statistical distribution of a machine learning model, a latency of a machine learning model, a number of inferences received by a machine learning model, a confidence level of a machine learning model (e.g., a level of confidence of that the accuracy of the machine learning model is known), etc., to the endpoint registry 126. The endpoint registry 126 can then use the quality metric rate to adjust the routing of inferences to virtual machine instances 142, as described in greater detail below. Similarly, the feedback processing system 190 can use a quality metric other than error rate to determine one or more modifications to the characteristics of a machine learning model executed by an ML container 160 of a virtual machine instance 142 that may result in an improvement to the accuracy or performance of the machine learning model.

In some embodiments, the feedback processing system 190 can perform additional operations, which are described in greater detail below.

Machine Learning Model Variants

In some embodiments, a virtual machine instance 142 includes a plurality of ML containers 160. Each of the ML containers 160 in the plurality execute a different machine learning model. However, these different machine learning models are related. For example, each machine learning model in a set of machine learning models can be a variant of the other machine learning models in the set. These machine learning models are related because they produce the same type of output given an input. However, the machine learning models in the set may be considered variants of each other because the machine learning models are configured or tuned with different hyperparameters, are configured to run different algorithms, and/or any combination thereof. In some embodiments, model learning models executed by different ML containers 160 initialized in different virtual machine instances 142 are related.

In further embodiments, the network traffic router 124 is configured to route an inference not only to a virtual machine instance 142 associated with an identified network address, but to a specific machine learning model variant executing within a single virtual machine instance 142 or to a specific machine learning model variant executing in one of several virtual machine instances 142. For example, the mapping stored in the endpoint mapping data store 130 can be a data structure that includes a mapping between an endpoint name and a list of machine learning model variants. Within the data structure, each machine learning model variant in the list is associated with a network traffic weight and a network address.

When the network traffic router 124 receives an inference, the network traffic router 124 can retrieve the mapping associated with the endpoint name included in the inference (in a manner as described above) in some embodiments. Using the mapping, the network traffic router 124 can identify machine learning model variants that are associated with the endpoint name and select one of the machine learning model variants based on the network traffic weight associated with each machine learning model variant in the list. For example, the network traffic weight may be a percentage (where the network traffic weights collectively add up to 100%), a decimal value (where the network traffic weights collectively add up to 1), a fraction or ratio (where the network traffic weights collectively add up to 1), and/or the like. The network traffic weight can be assigned to a machine learning model variant (e.g., by the endpoint registry 126) based on a historical accuracy of the machine learning model variant (e.g., as determined by the feedback processing system 190). The network traffic router 124 or the mapping data structure itself can track the number or percentage of inferences that have been routed to each machine learning model variant in the list in the past. In some embodiments, the network traffic router 124 can select a machine learning model variant that has received inferences a number or percentage of times less than should be routed to the machine learning model variant according to the associated network traffic weight. In some embodiments, the network traffic router 124 can select a machine learning model variant that last received an inference (e.g., if some or none of the machine learning model variants have received inference a number or percentage of times less than should be routed to the respective machine learning model variant according to the associated network traffic weight).

Once the machine learning model variant is selected, the network traffic router 124 uses the mapping to identify the network address associated with the selected machine learning model variant in some embodiments. The network traffic router 124 then routes the inference to the identified network address.

In some embodiments, multiple network addresses are associated with the same virtual machine instance 142. For example, each ML container 160 initialized in the same virtual machine instance 142 can have a different network address. Thus, in the embodiments in which the machine learning model variants execute within ML containers 160 initialized in the same virtual machine instance 142, the ML management container 150 can determine which ML container 160 to which to route the inference using the network address included, for example, in the destination field in the header of the packet that includes the inference.

In some embodiments, the network traffic weights included in the mapping data structure are adjusted dynamically based on the accuracy and/or performance of individual machine learning model variants. For example, the feedback processing system 190 can transmit the error rate and/or another quality metric to the endpoint registry 126, as described above. As the machine learning model variants receive inferences and produce execution results, the endpoint registry 126 can collect one or more quality metrics for some or all of the machine learning model variants. In some embodiments, the endpoint registry 126 ranks the machine learning model variants by quality metric(s) (e.g., where the machine learning model variant with the best quality metric(s) is ranked highest). The endpoint registry 126 also ranks the machine learning model variants by network traffic weight as included in the mapping corresponding to the subject machine learning model variants (e.g., where the machine learning model with the highest network traffic weight is ranked highest). The endpoint registry 126 then compares the quality metric(s) ranking to the network traffic weight ranking. If there is any discrepancy between the rankings (e.g., a first machine learning model variant is ranked first by quality metric(s), but is ranked in the bottom 50 percentile by network traffic weight), then the endpoint registry 126 adjusts the network traffic weights such that the rankings correspond with each other (e.g., the order in which machine learning model variants are ranked by quality metric(s) matches or nearly matches the order in which machine learning model variants are ranked by adjusted network traffic weight). In other words, the endpoint registry 126 adjusts the network traffic weights such that future inferences are routed to more accurate or better performing machine learning model variants (e.g., machine learning model variants with better quality metrics). In some embodiments, the endpoint registry 126 does not rank the machine learning model variants by quality metric(s) or network traffic weight, but simply identifies which machine learning model variant has the best quality metric(s), which machine learning model variant has the next best quality metric(s), and so on, and which machine learning model variant has the highest network traffic weight, which machine learning model variant has the next highest network traffic weight, and so on. The endpoint registry 126 can then make similar adjustments to the network traffic weights in a manner as described above.

In some embodiments, the endpoint registry 126 adjusts network traffic weights at periodic intervals. In some embodiments, the endpoint registry 126 adjusts network traffic weights each time a quality metric corresponding to a machine learning model variant is received. In some embodiments, the endpoint registry 126 adjusts network traffic weights in response to a user request (e.g., as received from a user device 102).

Once the endpoint registry 126 determines the adjusted network traffic weights, the endpoint registry 126 modifies the mapping to include the adjusted network traffic weights in some embodiments. The endpoint registry 126 then stores the modified mapping in the endpoint mapping data store 130 and/or transmits the modified mapping to the network traffic router 124 for storage in cache.

Thus, the components of the operating environment 100 can improve the accuracy of results produced by the model hosting system 140 not necessarily by improving the accuracy of individual machine learning model variants (although this is a possibility as described herein), but by dynamically adjusting the routing of inferences to machine learning model variants using feedback data such that more accurate machine learning model variants receive inferences more often than less accurate machine learning model variants.

Additional Embodiments of the Example Routing Environment

In some embodiments, the model hosting system 140 autoscales one or more virtual machine instances 142 based on the amount of network traffic directed to the virtual machine instances 142. For example, a user device 102 can provide one or more arbitrary metrics that determine whether autoscaling should occur (e.g., autoscale when the number of received inferences exceeds a threshold value, when the amount of used memory exceeds a threshold value, when the percentage of processing resources available for use drops below a threshold value, when the percentage of graphical processing resources available for use drops below a threshold value, etc.). When the metric determines that autoscaling should occur, the model hosting system 140 can provision additional computing resources to the subject virtual machine instance 142. In some embodiments, autoscaling includes provisioning additional copies of the subject virtual machine instance 142. Thus, the same machine learning model can execute in multiple, identical virtual machine instances 142 to account for increased demand. The network traffic router 124 can select one of the copies of the virtual machine instance 142 to receive an inference in a manner that distributes the traffic load across the virtual machine instance 142 copies. The same autoscaling functionality can also apply to shadow virtual machine instances 542 (e.g., a shadow model hosting system 540 can autoscale shadow virtual machine instances 542), which are described in greater detail below. As another example, a user's account can be pre-populated with one or metrics. A user can adjust the pre-populated metrics or leave the pre-populated metrics unchanged.

In further embodiments, the endpoint registry 126 tracks the health of one or more virtual machine instances 142. For example, the endpoint registry 126 periodically transmits health status checks to the virtual machine instances 142 and determines whether a virtual machine instance 142 is healthy based on the response (or lack of response). As another example, the virtual machine instances 142 actively transmit an indication of their respective health to the endpoint registry 126. Not receiving a health indication from a virtual machine instance 142 for a threshold period of time can indicate to the endpoint registry 126 that the subject virtual machine instance 142 is unhealthy.

In some embodiments, not shown, one or more load balancers are placed between the network traffic routers 124 and the virtual machine instances 142. The load balancers can distribute traffic directed to the different network addresses in a manner that reduces network traffic congestion.

The model hosting system 140 and/or the feedback processing system 190 can emit metrics associated with the executing machine learning models that are accessible to users via the user devices 102 in some embodiments. For example, the model hosting system 140 can emit qualitative metrics that describe the inputs received and/or the outputs generated by the ML containers 160 (e.g., the range of input values, the range of output values, categories of input and/or output values, the size of input and/or output data, etc.). As another example, the model hosting system 140 can provide error metrics that indicate when an execution error occurred. The error metrics can include the original input that caused the error, the virtual machine instance 142 and/or ML container 160 that produced the error, and/or generated error messages. Execution errors can occur, for example, if the original input provided to a machine learning model is not in a format readable or prescribed by the machine learning model.

In some embodiments, because the features of the operating environment 100 described herein allow for the dynamic adjusting of inference routing based on feedback data, the operating environment 100 thereby supports many different types of machine learning models, such as multi arm bandit models, reinforcement learning models, ensemble machine learning models, deep learning models, and/or the like.

The model hosting system 140 depicted in FIG. 1 is not meant to be limiting. For example, the model hosting system 140 could also operate within a computing environment having a fewer or greater number of devices than are illustrated in FIG. 1. Thus, the depiction of the model hosting system 140 in FIG. 1 should be taken as illustrative and not limiting to the present disclosure. For example, the model hosting system 140 or various constituents thereof (optionally in combination with the inference routing system 120 and/or the feedback processing system 190) could implement various Web services components, hosted or "cloud" computing environments, and/or peer-to-peer network configurations to implement at least a portion of the processes described herein. In some embodiments, the model hosting system 140 is implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The inference routing system 120, and the individual components therein, includes one or more computing devices with hardware components (e.g., processor(s), memory, network interfaces, etc.) that execute the operations described herein in some embodiments. Likewise, in some embodiments, the feedback processing system 190 includes one or more computing devices with hardware components (e.g., processor(s), memory, network interfaces, etc.) that execute the operations described herein.

The endpoint mapping data store 130 stores mapping data structures that identify mappings between endpoint names, machine learning model variants, network traffic weights, and/or network addresses. In further embodiments, the mapping data structures also store security tokens used for securely routing inferences to the model hosting system 140 and/or the shadow model hosting system 540 described below. While the endpoint mapping data store 130 is depicted as being located external to the inference routing system 120, the model hosting system 140, and the feedback processing system 190, this is not meant to be limiting. For example, in some embodiments not shown, the endpoint mapping data store 130 is located internal to at least one of the inference routing system 120, the model hosting system 140, or the feedback processing system 190.

The container data store 170 stores container images, such as container images used to form ML management containers 150, ML containers 160, ML management containers 550, and/or ML containers 560, that can be retrieved and used by various virtual machine instances 142 hosted by the model hosting system 140 to form the containers 150, 160, 550, and/or 560. While the container data store 170 is depicted as being located external to the inference routing system 120, the model hosting system 140, and the feedback processing system 190, this is not meant to be limiting. For example, in some embodiments not shown, the container data store 170 is located internal to at least one of the inference routing system 120, the model hosting system 140, or the feedback processing system 190.

The model data store 175 stores model data files. In some embodiments, some of the model data files are comprised of a single file, while other model data files are packages of multiple individual files. While the model data store 175 is depicted as being located external to the inference routing system 120, the model hosting system 140, and the feedback processing system 190, this is not meant to be limiting. For example, in some embodiments not shown, the model data store 175 is located internal to at least one of inference routing system 120, the model hosting system 140, or the feedback processing system 190.

The model prediction data store 180 stores execution results generated by the ML containers 160 and/or 560 (described below). While the model prediction data store 180 is depicted as being located external to the inference routing system 120, the model hosting system 140, and the feedback processing system 190, this is not meant to be limiting. For example, in some embodiments not shown, the model prediction data store 180 is located internal to at least one of the inference routing system 120, the model hosting system 140, or the feedback processing system 190.

The feedback data store 195 stores actual outputs that occurred given certain inputs and the inputs themselves. As described herein, the actual outputs are used to validate the execution results generated by the ML containers 160 and/or 560 for use in improving the accuracy of individual machine learning models and/or for use in adjusting the routing of inferences to more accurate machine learning models. While the feedback data store 195 is depicted as being located external to the inference routing system 120, the model hosting system 140, and the feedback processing system 190, this is not meant to be limiting. For example, in some embodiments not shown, the feedback data store 195 is located internal to at least one of the inference routing system 120, the model hosting system 140, or the feedback processing system 190.

While the inference routing system 120, the endpoint mapping data store 130, the model hosting system 140, the container data store 170, the model data store 175, the model prediction data store 180, the feedback processing system 190, and the feedback data store 195 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 102 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model hosting system 140 provides the user devices 102 with one or more user interfaces, command-line interfaces (CLI), application programing interfaces (API), and/or other programmatic interfaces for providing inferences and invoking the execution of machine learning models. As described herein, the inference routing system 120 can manage the routing of inferences and/or other data (e.g., machine learning model execution results) between user devices 102 and the model hosting system 140. Although one or more embodiments may be described herein as using a user interface, it should be appreciated that such embodiments may, additionally or alternatively, use any CLIs, APIs, or other programmatic interfaces.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Routing an Inference

Figure 2:
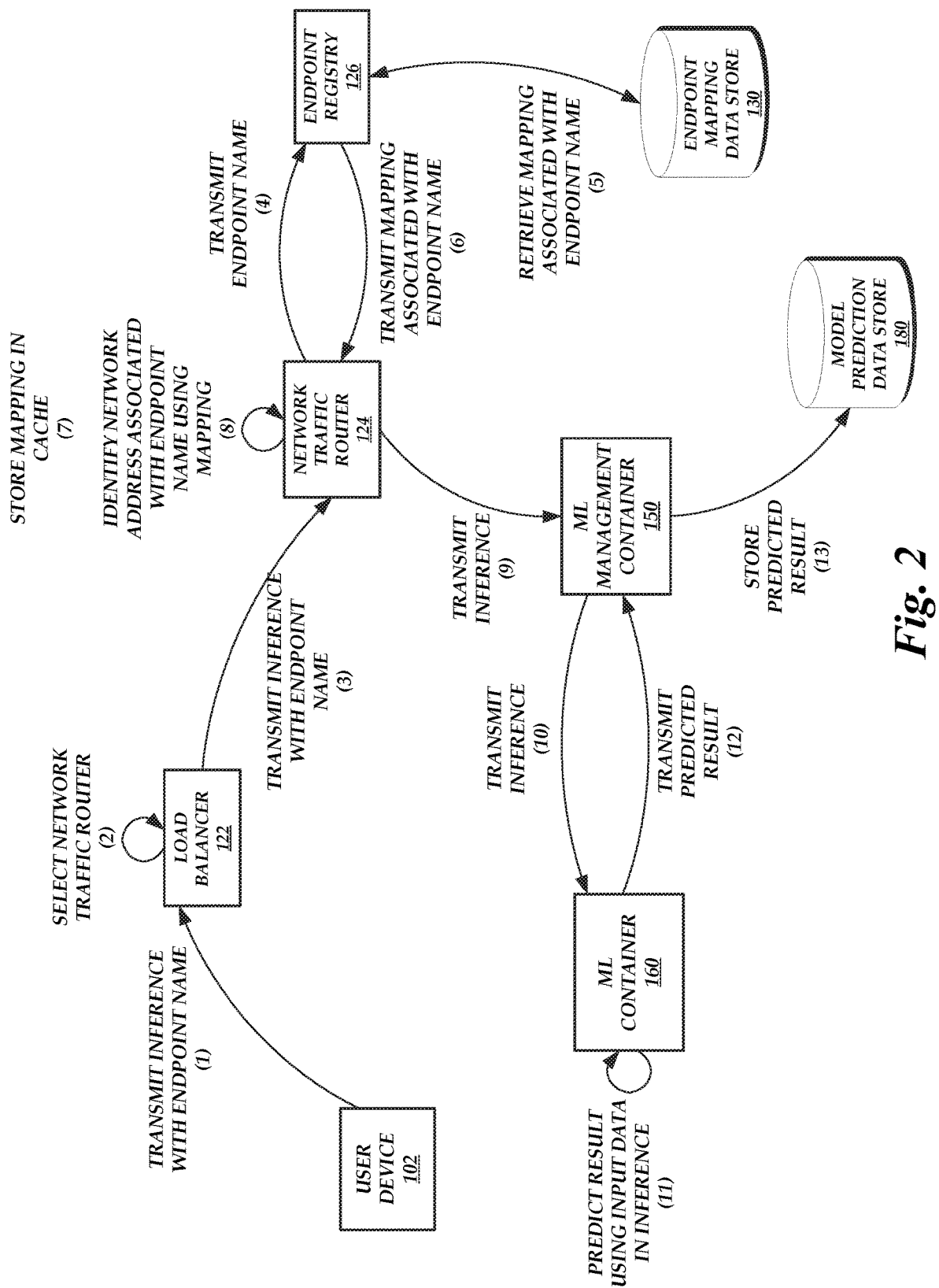
FIG. 2 is a block diagram of the operating environment of FIG. 1 illustrating the operations performed by the components of the operating environment to route an inference, according to some embodiments.

FIG. 2 is a block diagram of the operating environment 100 of FIG. 1 illustrating the operations performed by the components of the operating environment 100 to route an inference, according to some embodiments. As illustrated in FIG. 2, the user device 102 transmits an inference to the load balancer 122 at (1), where the inference includes an endpoint name. In some embodiments, the load balancer 122 selects a network traffic router 124 to receive the inference at (2). For example, the selection can be based on the current loads on the network traffic routers 124, based on a fixed distribution ratio, etc. The load balancer 122 then transmits the inference to the network traffic router 124 at (3). As described above, the load balancer can encrypt the inference and transmit the encrypted inference to the network traffic router 124.

In some embodiments, the network traffic router 124 transmits the endpoint name included in the inference to the endpoint registry 126 at (4). For example, the network traffic router 124 can decrypt the encrypted inference to obtain the endpoint name. The network traffic router 124 can transmit the endpoint name to the endpoint registry 126 after determining that the corresponding mapping is not stored in the cache local to the network traffic router 124.

The endpoint registry 126 retrieves a mapping associated with the endpoint name from the endpoint mapping data store 130 at (5) in some embodiments. The endpoint registry 126 then transmits the retrieved mapping associated with the endpoint name to the network traffic router 124 at (6).

In some embodiments, the network traffic router 124 stores the mapping in cache at (7). The network traffic router 124 also identifies a network address associated with the endpoint name using the mapping at (8). For example, the mapping includes a mapping between the endpoint name and a network address in some embodiments. Thus, the network traffic router 124 identifies the network address mapped to the endpoint name. As another example, the mapping includes a mapping between the endpoint name and a list of machine learning model variants in some embodiments, where each machine learning model variant is associated with a network traffic weight and a network address. The network traffic router 124 can then select a machine learning model variant from the list associated with the endpoint name using the network traffic weights, and identify a network address associated with the selected machine learning model variant.

Once the network address is identified, the network traffic router 124 transmits the inference to the ML management container 150 running in the virtual machine instance 142 associated with the identified network address at (9). As described above, the network traffic router 124 can encrypt the inference and transmit the encrypted inference to the ML management container 150. In some embodiments, the ML management container 150 transmits the inference (e.g., after decrypting the encrypted inference) to the ML container 160 at (10), where the ML container 160 is associated with the identified network address. As described above, the ML container 160 is initialized in the same virtual machine instance 142 as the ML management container 150 in some embodiments and is initialized in a different virtual machine instance 142 than the ML management container 150 in some embodiments.

The ML container 160 can obtain input data from the inference and predict a result using the input data at (11). For example, in some embodiments, the virtual machine instance 142 executes the code 166 stored within the ML container 160, which causes the input data to be applied as an input to an algorithm represented by the executable instructions included in code 166 and values in the model data (e.g., stored in the code 166 and/or top container layer) to be applied as other input parameters to the executable instructions included in the code 166. Execution of the code results in the prediction of a result. The ML container 160 then transmits the predicted result to the ML management container 150 at (12).

In some embodiments, the ML management container 150 stores the predicted result in the model prediction data store 180 at (13). In some embodiments, not shown, the ML management container 150 transmits the predicted result to the user device 102 (e.g., via the inference routing system 120). In some embodiments, not shown, the ML management container 150 transmits the predicted result to another system, such as the shadow model hosting system 540. In some embodiments, not shown, the ML management container 150 transmits the predicted result to the feedback processing system 190, which is described in greater detail below with respect to FIG. 3.

Example Block Diagram for Adjusting Inference Routing

Figure 3:
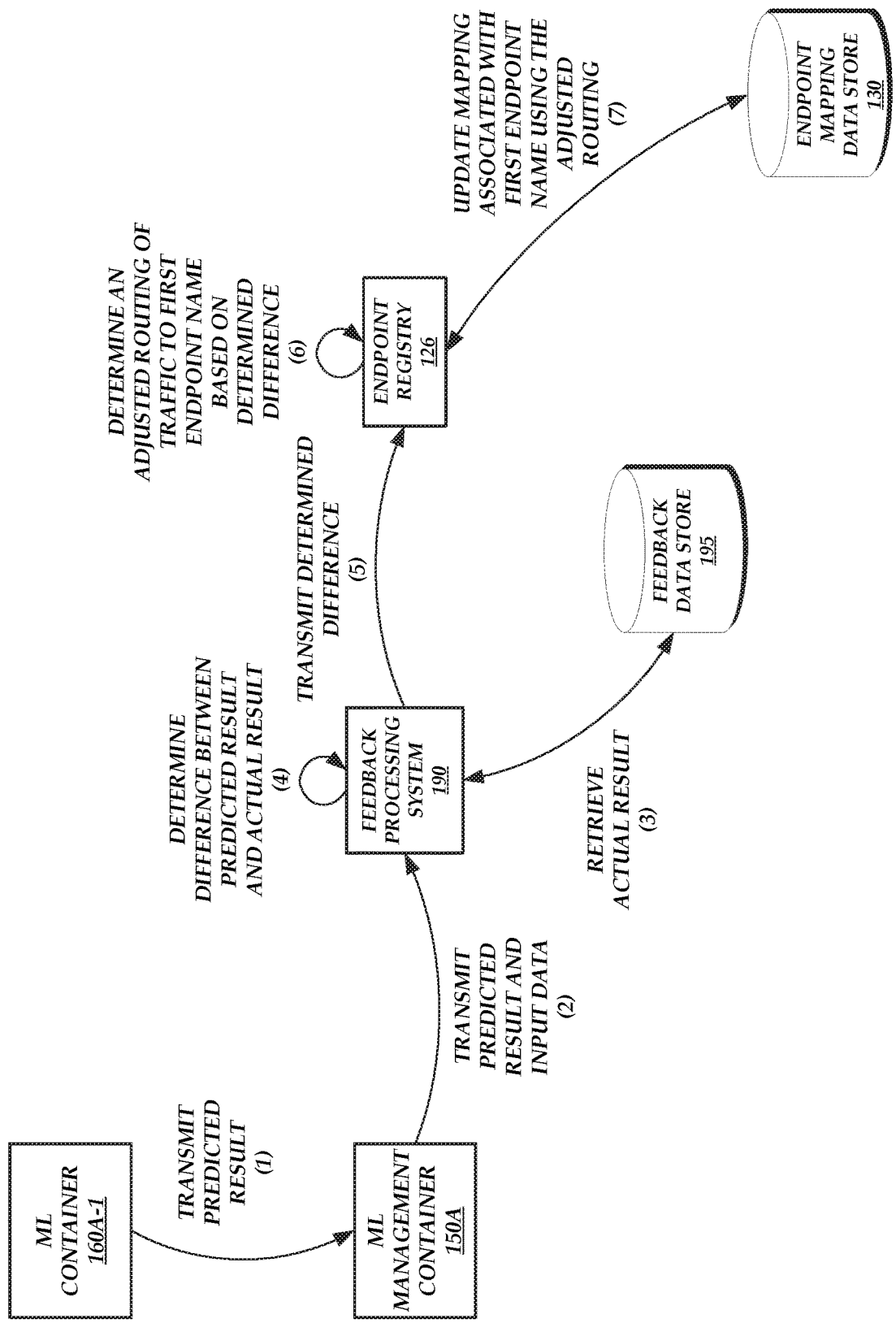
FIG. 3 is a block diagram of the operating environment of FIG. 1 illustrating the operations performed by the components of the operating environment to adjust inference routing, according to some embodiments.

FIG. 3 is a block diagram of the operating environment 100 of FIG. 1 illustrating the operations performed by the components of the operating environment 100 to adjust inference routing, according to some embodiments. In some embodiments, a first virtual machine instance 142A includes a plurality of ML containers 160A and an ML management container 150A. Each of the ML containers 160A in the plurality executes a different machine learning model, where the different machine learning models are variants of each other. Thus, a first endpoint name is mapped to the machine learning model variants executed by the plurality of ML containers 160A.

As illustrated in FIG. 3, an ML container 160A-1 in the plurality of ML containers 160A transmits a predicted result to the ML management container 150A at (1). In some embodiments, the ML management container 150A transmits the predicted result and input data from an inference that produced the predicted result to the feedback processing system 190 at (2).

The feedback processing system 190 retrieves an actual result corresponding to the input data from the feedback data store 195 at (3) in some embodiments. For example, the feedback data store 195 can store actual results and input data that caused the actual results. The feedback processing system 190 can query the feedback data store 195 using the input data included in the inference that produced the predicted result to retrieve the corresponding actual result.

The feedback processing system 190 can then determine a difference between the predicted result and the actual result at (4). In some embodiments, the difference corresponds to an error rate associated with the machine learning model variant executed by the ML container 160A-1. The feedback processing system 190 then transmits the determined difference to the endpoint registry 126 at (5).

In some embodiments, the endpoint registry 126 determines an adjusted routing of traffic to the first endpoint name based on the determined difference at (6). For example, the endpoint registry 126 can identify the current network traffic weights for the plurality of ML containers 160A (e.g., as indicated in the corresponding mapping). If the determined difference is higher than the error rate of a machine learning model variant executed by a second ML container 160A-2, yet the network traffic weight of the machine learning model variant executed by the first ML container 160A-1 is higher than the network traffic weight of the machine learning model variant executed by the second ML container 160A-2, then the endpoint registry 126 can adjust the network traffic weights such that the network traffic weight of the machine learning model variant executed by the first ML container 160A-1 is no longer higher than the network traffic weight of the machine learning model variant executed by the second ML container 160A-2 (e.g., by decreasing the network traffic weight of the machine learning model variant executed by the first ML container 160A-1 and/or by increasing the network traffic weight of the machine learning model variant executed by the second ML container 160A-2). Likewise, if the determined difference is lower than the error rate of the machine learning model variant executed by the second ML container 160A-2, yet the network traffic weight of the machine learning model variant executed by the first ML container 160A-1 is lower than the network traffic weight of the machine learning model variant executed by the second ML container 160A-2, then the endpoint registry 126 can adjust the network traffic weights such that the network traffic weight of the machine learning model variant executed by the first ML container 160A-1 is no longer lower than the network traffic weight of the machine learning model variant executed by the second ML container 160A-2 (e.g., by increasing the network traffic weight of the machine learning model variant executed by the first ML container 160A-1 and/or by decreasing the network traffic weight of the machine learning model variant executed by the second ML container 160A-2).

Once the adjusted traffic routing is determined, the endpoint registry 126 can update the mapping associated with the first endpoint name and the plurality of ML containers 160A using the adjusted traffic routing at (7). For example, in some embodiments, the endpoint registry 126 updates the mapping by adjusting one or more network traffic weights and stores the updated mapping in the endpoint mapping data store 130. In some embodiments, not shown, the endpoint registry 126 alternatively or in addition transmits the updated mapping to the network traffic router 124 for storage in cache.

Figure 4:
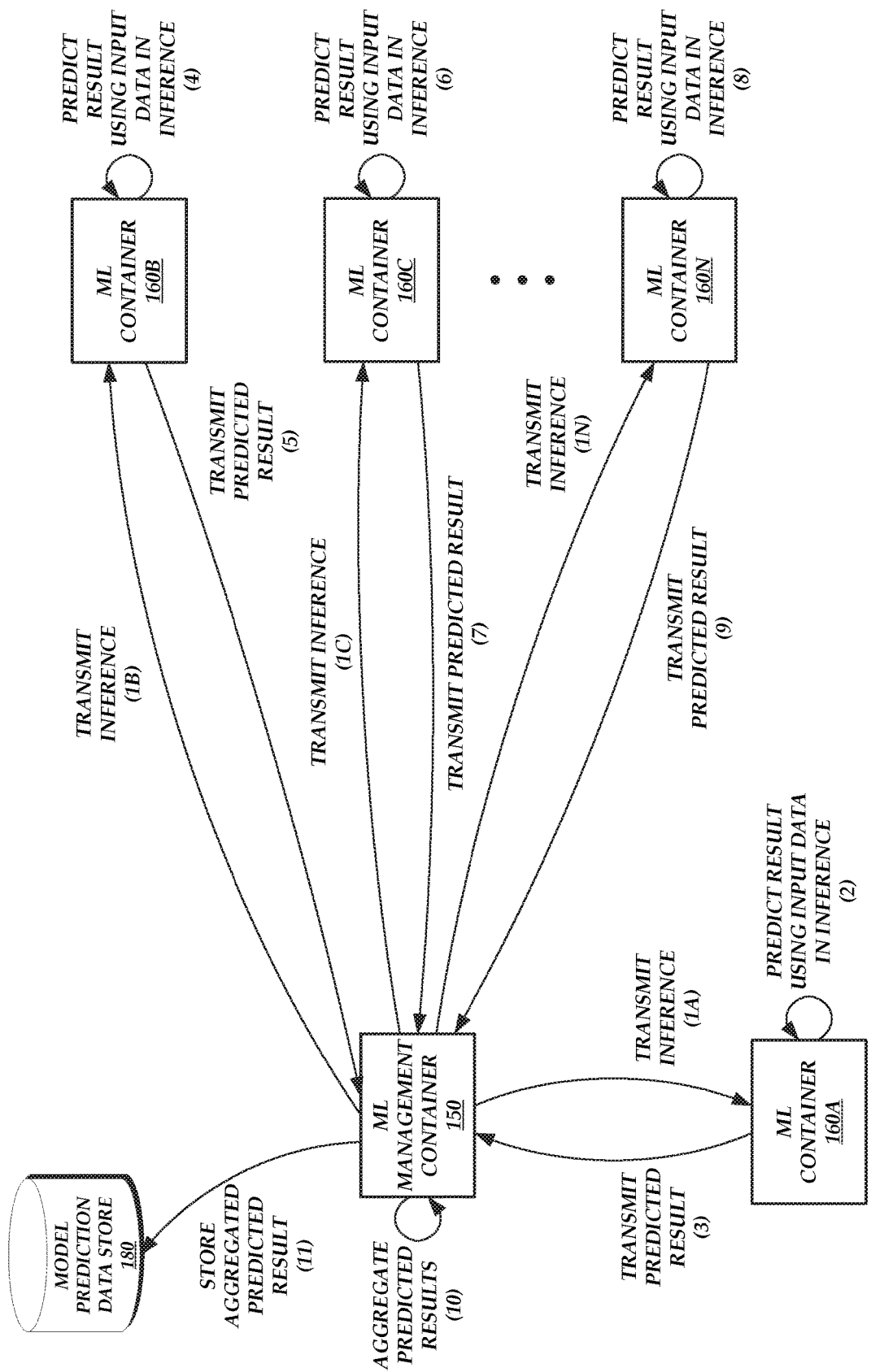
FIG. 4 is a block diagram of the operating environment of FIG. 1 illustrating the operations performed by the components of the operating environment to route inferences with ensemble machine learning models, according to some embodiments.

Example Block Diagram for Inference Routing with Ensemble Machine Learning Models FIG. 4 is a block diagram of the operating environment 100 of FIG. 1 illustrating the operations performed by the components of the operating environment 100 to route inferences with ensemble machine learning models, according to some embodiments. In some embodiments, a first virtual machine instance 142A includes ML containers 160A-N and an ML management container 150. Each of the ML containers 160A-N executes a different machine learning model, where the different machine learning models are variants of each other. Collectively, the machine learning model variants form an ensemble machine learning model, where the output of each machine learning model variant will be aggregated to produce a single result, as is described in greater detail below. In some embodiments, not shown, the machine learning model variants that form the ensemble machine learning model execute in ML containers 160 that are initialized by different virtual machine instances 142.

In some embodiments, a user, via the user device 102, identifies which virtual machine instances 142 and/or ML containers 160 collectively form an ensemble machine learning model. In some embodiments, the model hosting system 140 determines which virtual machine instances 142 and/or ML containers 160 to group to form an ensemble machine learning model.

While FIG. 4 depicts that N machine learning model variants form the ensemble machine learning model, this is not meant to be limiting. In embodiments, any number of machine learning model variants (e.g., 2, 3, 4, 5, 6, 7, etc.) can form the ensemble machine learning model.

As illustrated in FIG. 4, the ML management container 150 receives an inference from the network traffic router 124 and transmits the inference to the ML container 160A at (1A), to the ML container 160B at (1B), to the ML container 160C at (1C), and so on until ensemble ML containers 160A-N have a copy of the inference. In some embodiments, the ML management container 150 transmits the inferences simultaneously (e.g., multicasts the inferences). In some embodiments, the ML management container 150 transmits the inferences in an ordered sequence. For example, the ML management container 150 can transmit the inference to the ML container 160B, then transmit the inference to the ML container 160C, and so on. As another example, the ML management container 150 can transmit the inference to the ML container 160B. After the ML container 160B returns a predicted result, then the ML management container 150 can transmit the inference to the ML container 160C, and so on.

Once the ML containers 160A-N receive the inference, the virtual machine instances 142 can execute code stored within the containers 160A-N in parallel, in sequence, and/or any combination thereof. For the purposes of simplicity, FIG. 4 depicts that the code stored within the containers 160A-N is executed in sequence, but this is not meant to be limiting.

Once the ML container 160A receives the inference, the ML container 160A predicts a result using input data included in the inference at (2) in some embodiments (e.g., the virtual machine instance 142 executes the code 166 stored in the ML container 160A using the input data included in the inference). The ML container 160A then transmits the predicted result to the ML management container 150 at (3).

In some embodiments, the ML container 160B then predicts a result using input data included in the inference at (4) (e.g., the virtual machine instance 142 executes the code 166 stored in the ML container 160B using the input data included in the inference). The ML container 160B then transmits the predicted result to the ML management container 150 at (5).

Similarly, the ML container 160C then predicts a result using input data included in the inference at (6) (e.g., the virtual machine instance 142 executes the code 166 stored in the ML container 160C using the input data included in the inference). The ML container 160C then transmits the predicted result to the ML management container 150 at (7).

Likewise, the ML container 160N then predicts a result using input data included in the inference at (8) (e.g., the virtual machine instance 142 executes the code 166 stored in the ML container 160N using the input data included in the inference). The ML container 160N then transmits the predicted result to the ML management container 150 at (9).

In some embodiments, the ML management container 150 aggregates the received predicted results at (10) to form an aggregated predicted result. For example, the virtual machine instance 142 can execute code stored within the ML management container 150 to cause the ML management container 150 to average the received predicted results to form the aggregated predicted result. As another example, each of the ML containers 160A-N can be assigned a weight (e.g., a weight based on machine learning model variant accuracy). The ML management container 150 can apply each ML container 160A-N weight to the result predicted by the respective ML container 160A-N, and aggregate the weighted results (e.g., sum the weighted results, average the weighted results, etc.).

In some embodiments, once the predicted results are aggregated, the ML management container 150 stores the aggregated predicted result in the model prediction data store 180 at (11). In some embodiments, not shown, the ML management container 150 transmits the aggregated predicted result to the user device 102 (e.g., via the inference routing system 120). In some embodiments, not shown, the ML management container 150 transmits the aggregated predicted result to another system, such as the shadow model hosting system 540.

In some embodiments, not shown, the ML management container 150 transmits the aggregated predicted result to the feedback processing system 190. The feedback processing system 190 can compare the aggregated predicted result with the actual result to determine possible modifications to the ensemble machine learning model that can improve the accuracy of the ensemble machine learning model. For example, the difference between the aggregated predicted result and the actual result may indicate that the prediction result aggregation method should be modified, such as a modification to the weights used in aggregation in some embodiments, and/or that one or more machine learning model variants in the ensemble should be modified. The feedback processing system 190 can determine an appropriate modification and communicate with the ML management container 150 and/or the other ML management containers 150 to implement the modification.

In some embodiments, the feedback processing system 190 can track the error rate (e.g., the difference between aggregated predicted results and actual results) and/or other quality metrics over a period of time. If, after one modification to the aggregation method and/or the machine learning model variant(s) in the ensemble, the error rate increases and/or another quality metric changes, then the feedback processing system 190 can determine that the previous modification reduced the accuracy of the ensemble machine learning model and can determine a new modification that reverses the previous modification and/or that results in additional modifications to the aggregation method and/or to the machine learning model variant(s) in the ensemble. On the other hand, if, after one modification to the aggregation method and/or the machine learning model variant(s) in the ensemble, the error rate decreases or remains stable and/or another quality metric improves or remains stable, then the feedback processing system 190 can make no further modifications to the aggregation method and/or the machine learning model variant(s) in the ensemble or can determine a further modification in line with the previous modification (e.g., in a previous modification the weight associated with the ML container 160A was increased by a decimal point, and thus the further modification includes an increase to the weight associated with the ML container 160A by another decimal point). Accordingly, the feedback processing system 190 can improve the accuracy of the ensemble machine learning model over time using feedback data (e.g., actual results).

In some embodiments, some ensemble machine learning models are related to other ensemble machine learning models (e.g., the ensemble machine learning models each make the same type of prediction and/or take the same type of input). The feedback processing system 190 can use information learned from one ensemble machine learning model to improve the accuracy of other related ensemble machine learning models. For example, the feedback processing system 190 can determine that a first modification to the aggregation method and/or to the machine learning model variant(s) in a first ensemble machine learning model causes an improvement in the accuracy of the first ensemble machine learning model (e.g., an improvement in the accuracy of the aggregated predicted result produced by the first ensemble machine learning model). In some embodiments, the feedback processing system 190 generates a notification for reception by a user operating a user device 102 that is associated with a second ensemble machine learning model related to the first ensemble machine learning model suggesting that making the first modification to the second ensemble machine learning model may result in an improvement to the accuracy of the second ensemble machine learning model. In some embodiments, the feedback processing system 190 automatically communicates with one or more of the ML management containers 150 associated with the second ensemble machine learning model to implement the first modification to potentially improve the accuracy of the second ensemble machine learning model.

In some embodiments, not shown, the ML container 160A communicates with the ML containers 160B-N rather than the ML management container 150. For example, the ML container 160A can serve as a master or controller container. The ML container 160A can receive an inference from the ML management container 150 and then multicast the inference to the other ML containers 160B-N. The other ML containers 160B-N can then return the predicted results to the ML container 160A or the ML management container 150. If the ML container 160A receives the predicted results, the ML container 160A either can forward the predicted results to the ML management container 150 to allow the ML management container 150 to perform the aggregation or can aggregate the predicted results and send the aggregated predicted result to the ML management container 150.

In some embodiments, not shown, the ML containers 160A-N are initialized in different virtual machine instances 142. Thus, a first ML management container 150 can transmit the inferences to other ML management containers 150 initialized in the different virtual machine instances 142. The other ML management containers 150 can then each route the inference to the ML container 160A-N initialized in the same virtual machine instance 142, receive a predicted result from the ML container 160A-N initialized in the same virtual machine instance 142, and then transmit the predicted result back to the first ML management container 150. The first ML management container 150 can then aggregate the predicted results to form an aggregated predicted result. Alternatively, a first ML management container 150 can transmit the inference to the ML container 160A, and the ML container 160A can route the inference to the other ML containers 160B-N directly or via the respective ML management container 150 initialized in the same virtual machine instance 142 as an ML container 160B-N. The ML container 160A can receive the results predicted by the ML containers 160B-N (directly or via the respective ML management containers 150) and either provide all of the predicted results to the first ML management container 150 or aggregate the predicted results and provide the aggregated predicted result to the first ML management container 150. In some embodiments, instead of the first ML management container 150 or the ML container 160A routing the inference to other ML containers 160B-N, the network traffic router 124 routes the inference to each of the ML management containers 150 associated with ML containers 160A-N in the ensemble.

Shadow Variants

Figure 5:
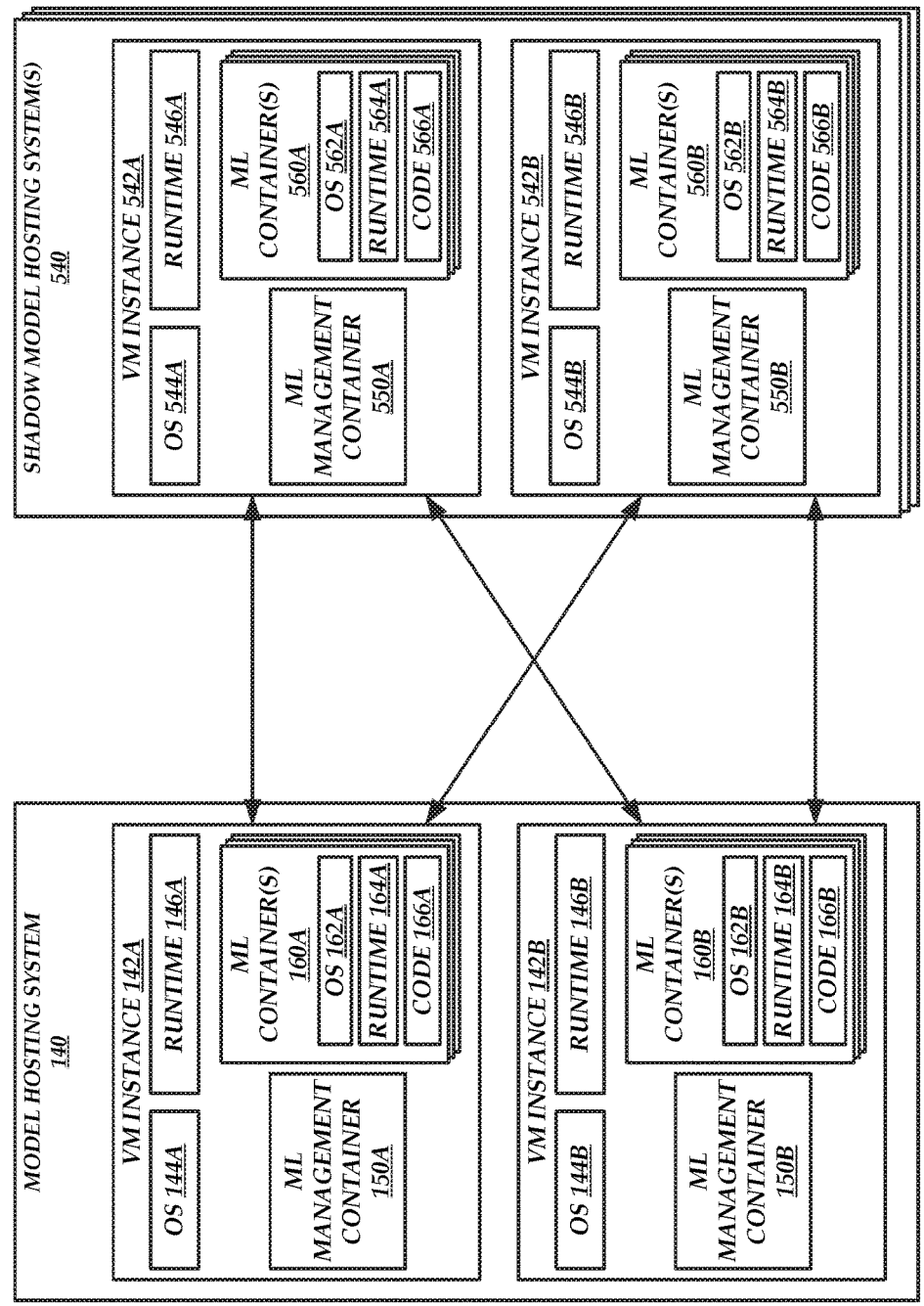
FIG. 5 is another block diagram of the operating environment in which one or more shadow model hosting systems communicate with the model hosting system, in some embodiments.

FIG. 5 is another block diagram of the operating environment 100 in which one or more shadow model hosting systems 540A communicate with the model hosting system 140, in some embodiments. In some embodiments, the virtual machine instances 142 hosted by the model hosting system 140 are live or in production (e.g., the virtual machine instances 142 are fully operational and produce real execution results that are stored and/or used as described herein). However, a user may desire to test a virtual machine instance, and the machine learning model executed therein, prior to allowing the virtual machine instance to become live or be placed in production. For example, a user may desire to test a virtual machine instance, and the machine learning model executed therein, before the virtual machine instance becomes live to determine whether the test machine learning model is more or less accurate than the live machine learning model without impacting current network traffic. In such a situation, the user, via the user device 102, can instruct the machine learning service to provision a test environment, referred to herein as a "shadow model hosting system."

In some embodiments, each provisioned virtual machine instance 542 in a shadow model hosting system 540 is associated with a particular virtual machine instance 142. For example, a particular virtual machine instance 542 in the shadow model hosting system 540 can be provisioned to test a modification to the machine learning model executing in a particular virtual machine instance 142 or to test a machine learning model designed to be an alternative to the machine learning model executing in a particular virtual machine instance 142. One or more virtual machine instances 542 and/or one or more shadow model hosting systems 540 can be associated with the same virtual machine instance 142. Thus, multiple machine learning models related in some manner to a live machine learning model can be tested in parallel, in sequence, and/or any combination thereof. For the purposes of simplicity, FIG. 5 depicts one virtual machine instance 542A that is associated with the virtual machine instance 142A and one virtual machine instance 542B that is associated with the virtual machine instance 142B. However, this is not meant to be limiting, as the operating environment 100 can include one or more virtual machine instances 542A associated with virtual machine instance 142A, one or more virtual machine instances 542B associated with virtual machine instance 142B, and so on.

As illustrated in FIG. 5, the shadow model hosting system 540 is a replica or near replica of the model hosting system 140 in some embodiments. For example, the shadow model hosting system 540 hosts a virtual machine instance 542A and a virtual machine instance 542B. The virtual machine instance 542A includes an OS 544A, a runtime 546A, a ML management container 550A, and one or more ML containers 560A. The ML containers 560A each further include an OS 562A, a runtime 564A, and code 566A. The virtual machine instance 542B includes an OS 544B, a runtime 546B, a ML management container 550B, and one or more ML containers 560B. The ML containers 560B each further include an OS 562B, a runtime 564B, and code 566B. Thus, the shadow model hosting system 540 includes the components used by the live model hosting system 140 to execute machine learning models and provide the other functionality described herein.

In some embodiments, the code 566 includes the executable instructions in the container image that represent an algorithm that defines a machine learning model that is a variant of the machine learning model executed by an ML container 160 (e.g., the machine learning model has a different algorithm and/or is tuned with different hyperparameter(s) than the machine learning model executed by the ML container 160). The ML container 560 further includes model data (e.g., stored in a top container layer) that includes characteristics of a machine learning model that is a variant of the machine learning model executed by an ML container 160. Thus, the machine learning model described by a combination of the code 566 and the ML container 560 model data can be referred to herein as a "shadow variant" and the ML container 560 itself can be referred to herein as a "shadow ML container." Additional details of shadow ML container provisioning and execution are described below with respect to FIGS. 6 and 7.

In some embodiments, while the virtual machine instance 542A is associated with the virtual machine instance 142A, the virtual machine instance 142A can nonetheless communicate with other virtual machine instances 542, such as virtual machine instance 542B. For example, the virtual machine instance 142A can execute a first machine learning model variant and the virtual machine instance 142B can execute a second machine learning model variants. Because the virtual machine instances 142A-142B execute machine learning models that are variants of each other, such virtual machine instances 142A-142B can communicate with any shadow virtual machine instance 542 that is associated with a virtual machine instance 142 that executes a machine learning model in the variant. In some embodiments, each virtual machine instance 142A-142B that executes a machine learning model variant communicates with the same set shadow virtual machine instances 542A-542B. For example, both virtual machine instance 142A and 142B can transmit an inference and a predicted result to both virtual machine instance 542A and 542B. In some embodiments, virtual machine instances 142A-142B that execute a machine learning model variant communicate with the same or different set of shadow virtual machine instances 542A-542B. For example, the virtual machine instance 142A can transmit an inference and a predicted result to the shadow virtual machine instance 542A, and the virtual machine instance 142B can transmit an inference and a predicted result to the shadow virtual machine instances 542A-542B.

In some embodiments, one ML container 160 is associated with one or more ML containers 560, one or more virtual machine instances 542, and/or one or more shadow model hosting systems 540. In some embodiments, one virtual machine instance 142A is associated with one or more ML containers 560, one or more virtual machine instances 542, and/or one or more shadow model hosting systems 540. In some embodiments, one model hosting system 140 is associated with one or more ML containers 560, one or more virtual machine instances 542, and/or one or more shadow model hosting systems 540. Any ML container 160, virtual machine instance 142, or model hosting system 140 can communicate with a corresponding shadow ML container 560, shadow virtual machine instance 542, or shadow model hosting system 540. Similarly, any first ML container 160, first virtual machine instance 142, or first model hosting system 140 can communicate with a shadow ML container 560, a shadow virtual machine instance 542, or a shadow model hosting system 540 associated with a second ML container 160, second virtual machine instance 142, or second model hosting system 140 that corresponds with a second machine learning model that is a variant of a first machine learning model corresponding to the first ML container 160, first virtual machine instance 142, or first model hosting system 140.

Figure 6:
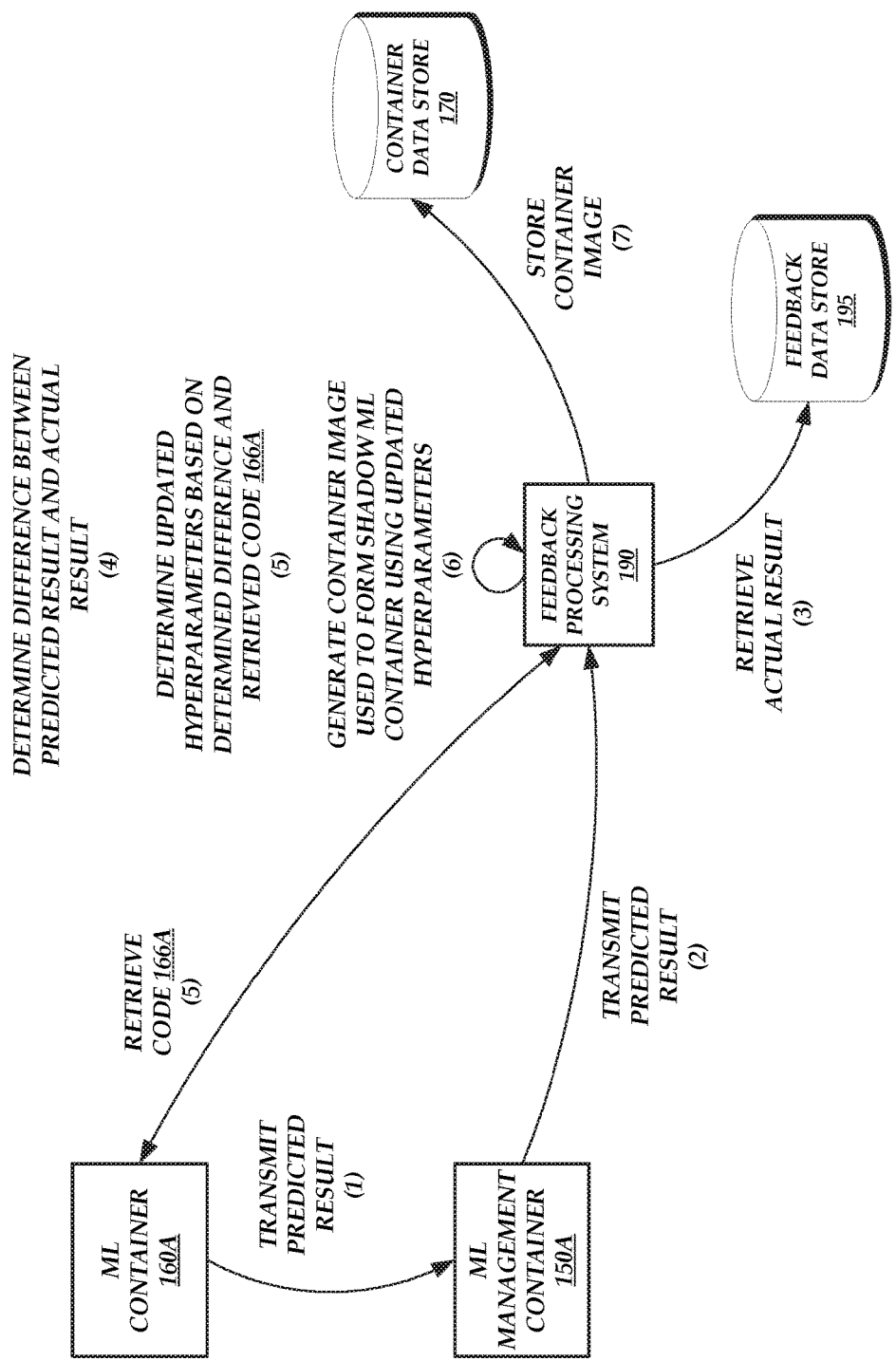
FIG. 6 is a block diagram of the operating environment of FIG. 1 illustrating the operations performed by the components of the operating environment to initialize a shadow ML container that executes a shadow variant, according to some embodiments.

FIG. 6 is a block diagram of the operating environment 100 of FIG. 1 illustrating the operations performed by the components of the operating environment 100 to initialize a shadow ML container that executes a shadow variant, according to some embodiments. In some embodiments, a first virtual machine instance 142A includes an ML container 160A and an ML management container 150A.

In some embodiments, the ML container 160A receives an inference and generates a predicted result using input data included in the inference (e.g., the virtual machine instance 142A executes the code 166A stored in the ML container 160A using the input data included in the inference). As illustrated in FIG. 6, the ML container 160A transmits the predicted result to the ML management container 150A at (1), and the ML management container 150A transmits the predicted result to the feedback processing system 190 at (2).

The feedback processing system 190 retrieves an actual result corresponding to the input data from the feedback data store 195 at (3) in some embodiments. For example, the feedback data store 195 can store actual results and input data that caused the actual results. The feedback processing system 190 can query the feedback data store 195 using the input data included in the inference that produced the predicted result to retrieve the corresponding actual result.

The feedback processing system 190 can then determine a difference between the predicted result and the actual result at (4). In some embodiments, the difference corresponds to a quality metric associated with the machine learning model executed by the ML container 160A. In some embodiments, the feedback processing system 190 retrieves the code 166A executed by the virtual machine instance 142A to generate the predicted result (e.g., the code 166A that includes executable instructions that represent an algorithm of the machine learning model) and determines updated hyperparameters based on the determined difference and the retrieved code at (5). In some embodiments, not shown, the feedback processing system 190 retrieves the code 166A executed by the virtual machine instance 142A to generate the predicted result and determines a new algorithm based on the determined difference and the retrieved code.

The feedback processing system 190 then generates a container image that can be used to form a shadow ML container using the updated hyperparameters (and/or using the new algorithm) at (6) in some embodiments. For example, the feedback processing system 190 can generate a container image using a version of the code 166A modified with the updated hyperparameters (and/or with the new algorithm). The feedback processing system 190 then stores the container image in the container data store 170 at (7). The container image used to form a shadow ML container can later be retrieved by a provisioned shadow model hosting system 540A for initializing a shadow ML container within a hosted virtual machine instance 542, thereby allowing the machine learning model testing to commence.

In some embodiments, not shown, a user, via the user device 102, can generate a container image used to form a shadow ML container. The user device 102 can then transmit the user-generated container image to the inference routing system 120, the model hosting system 140, and/or the feedback processing system 190. The receiving system 120, 140, and/or 190 can then store the user-generated container image in the container data store 170.

In some embodiments, not shown, the feedback processing system 190 generates a container image used to form a production ML container instead of a shadow ML container using the updated hyperparameters (and/or the new algorithm) and stores the container image in the container data store 170. The model hosting system 140 can then retrieve the container image, form a production ML container using the container image, and either replace a current ML container 160 with the production ML container or add the production ML container, and the machine learning model executed therein, as a new machine learning model variant to an existing set of machine learning model variants. Thus, the production ML container can immediately enter production rather than be tested in a shadow model hosting system 540.

Figure 7:
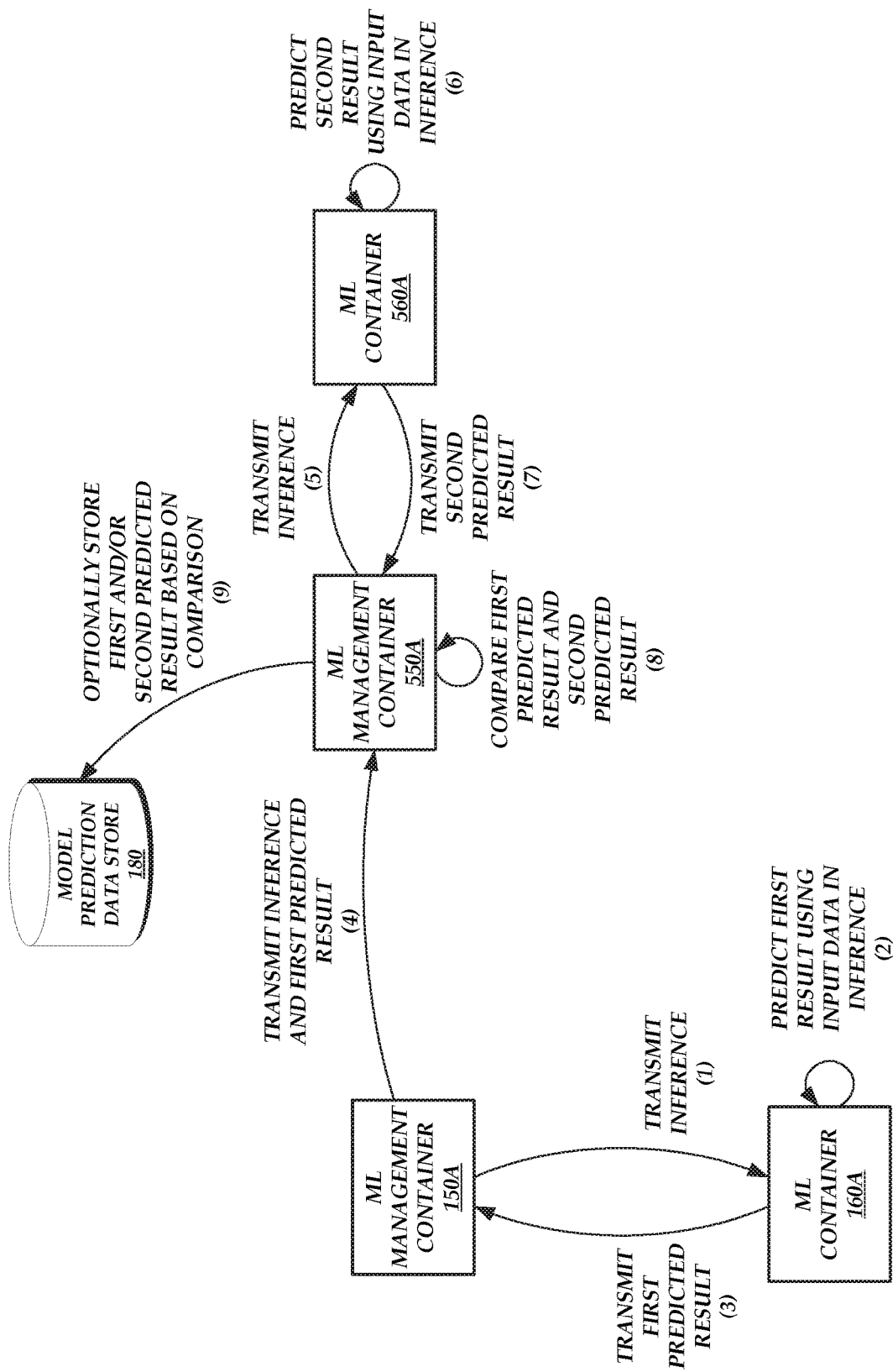
FIG. 7 is a block diagram of the operating environment of FIG. 1 illustrating the operations performed by the components of the operating environment to selectively store prediction results, according to some embodiments.

FIG. 7 is a block diagram of the operating environment 100 of FIG. 1 illustrating the operations performed by the components of the operating environment 100 to selectively store prediction results, according to some embodiments. In some embodiments, a first virtual machine instance 142A includes an ML container 160A and an ML management container 150A. A shadow model hosting system 540A corresponding to the first virtual machine instance 142A hosts a shadow virtual machine instance 542A that includes a shadow ML management container 550A and a shadow ML container 560A. The machine learning model executed by the ML container 160A is related to, but not the same as, the machine learning model executed by the shadow ML container 560A.

As illustrated in FIG. 7, the ML management container 150A transmits an inference to the ML container 160A at (1) in some embodiments. The ML container 160A receives the inference and predicts a first result using input data included in the inference at (2) (e.g., the virtual machine instance 142A executes the code 166 stored in the ML container 160A using the input data included in the inference). The ML container 160A then transmits the first predicted result to the ML management container 150A at (3).

Once the ML management container 150A receives the first predicted results, the ML management container 150A transmits the inference and the first predicted result to the shadow ML management container 550A at (4) in some embodiments. The shadow ML management container 550A can transmit the inference to the shadow ML container 560A at (5). The shadow ML container 560A receives the inference and predicts a second result using input data included in the inference at (6) (e.g., the virtual machine instance 542A executes the code 566A stored in the shadow ML container 560A using the input data included in the inference). The shadow ML container 560A then transmits the second predicted result to the shadow ML management container 550A at (7).

In some embodiments, the shadow ML management container 550A compares the first predicted result and the second predicted result at (8). Based on the comparison, the shadow ML management container 550A optionally stores the first and/or second predicted result in the model prediction data store 180. For example, if the first and second predicted results match, the shadow ML management container 550A does not store either result or just stores the first predicted result in the model prediction data store 180. However, if the first and second predicted results are different, then the shadow ML management container 550A stores one or both of the predicted results in the model prediction data store 180. In some embodiments, not shown, the shadow ML management container 550A optionally transmits the first and/or second predicted result to the user device 120 via the model hosting system 140 and/or the inference routing system 120.

In some embodiments, not shown, the shadow ML management container 550A forwards the second predicted result to the ML management container 150A. The ML management container 150A then performs the comparison, optional storage, and/or optional transmission to the user device 102.

Example Machine Learning Model Accuracy Improvement Routine

Figure 8:
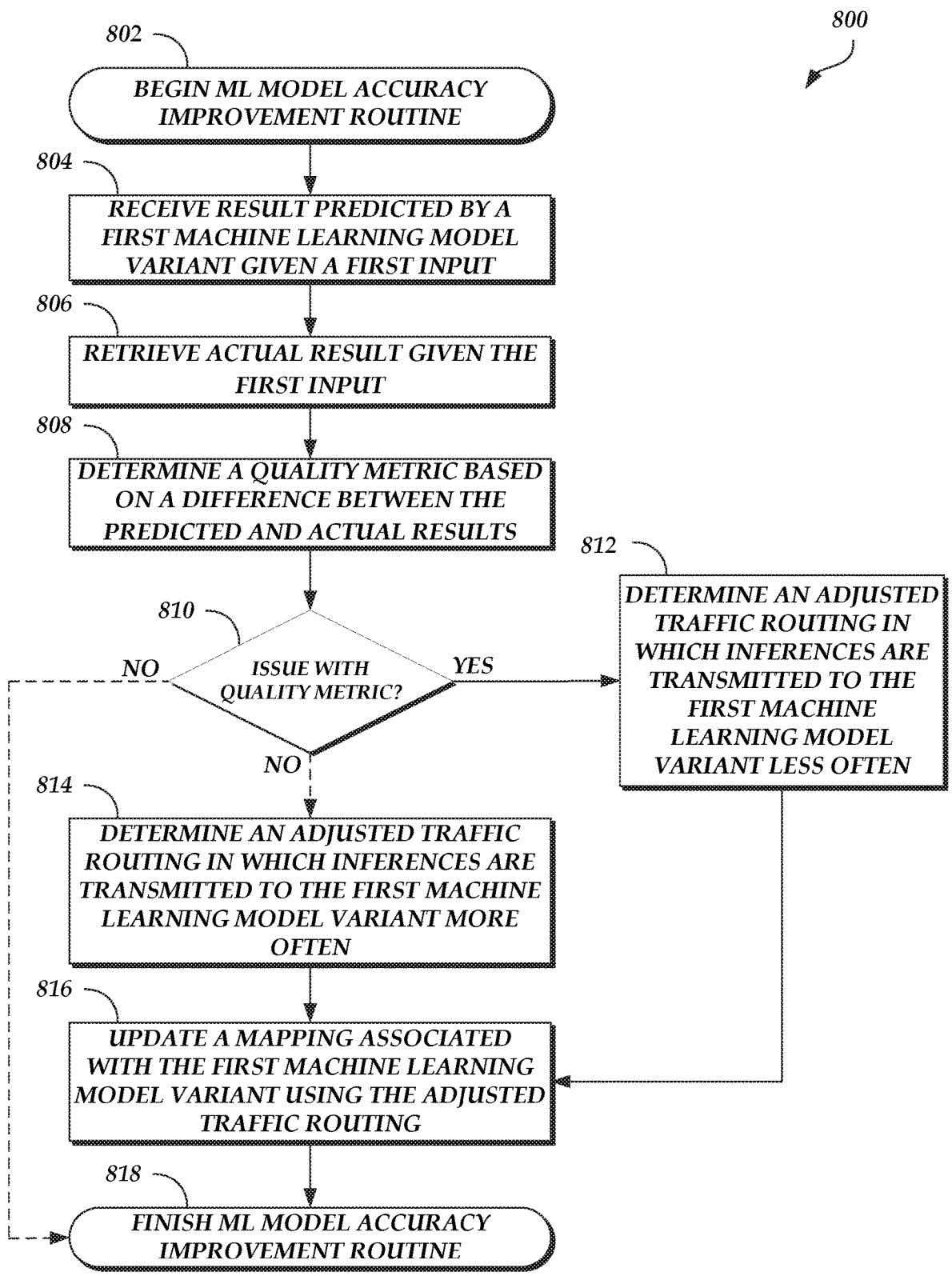
FIG. 8 is a flow diagram depicting a machine learning model accuracy improvement routine illustratively implemented by a feedback processing system and/or an endpoint registry, according to some embodiments.

FIG. 8 is a flow diagram depicting a machine learning model accuracy improvement routine 800 illustratively implemented by a feedback processing system and/or an endpoint registry, according to some embodiments. As an example, the feedback processing system 190 and/or the endpoint registry 126 of FIG. 1 can be configured to execute the machine learning model accuracy improvement routine 800. The machine learning model accuracy improvement routine 800 begins at block 802.

At block 804, in some embodiments, a result predicted by a first machine learning model variant given a first input is received. For example, the first machine learning model variant can be part of a multi arm bandit machine learning model, an ensemble machine learning model, a deep learning machine learning model, and/or the like. The result is received from the model prediction data store 180 or the ML management container 150 associated with the ML container 160 that executes the first machine learning model variant.

At block 806, in some embodiments, an actual result produced given the first input is retrieved. For example, the actual result is retrieved from the feedback data store 195 using the first input.

At block 808, in some embodiments, a quality metric (e.g., an error rate of the first machine learning model variant, a statistical distribution of the first machine learning model variant, a latency of the first machine learning model variant, a number of inferences received by the first machine learning model variant, a confidence level of the first machine learning model variant, etc.) is determined based on a difference between the predicted and actual results. The quality metric can be an absolute value, a percentage, and/or the like.

At block 810, in some embodiments, a determination is made as to whether there is an issue with the quality metric. In embodiments in which the quality metric is an error rate, there can be an issue if the error rate associated with the first machine learning model variant is greater than a threshold value, or if the error rate associated with a second machine learning model variant that receives inferences less often than the first machine learning model variant according to network traffic weights included in a mapping data structure is less than the error rate of the first machine learning model variant. In embodiments in which the quality metric is a statistical distribution, there can be an issue if the statistical distribution of the first machine learning model variant is not an expected or desired distribution (e.g., not a binomial distribution, a Poisson distribution, a geometric distribution, a normal distribution, Gaussian distribution, etc.). In embodiments in which the quality metric is latency, there can be an issue if the latency (e.g., execution latency) of the first machine learning model variant exceeds a threshold value and/or is greater than the latency of a second machine learning model variant. In embodiments in which the quality metric is a number of received inferences, there can be an issue if the number of inferences received by the first machine learning model is above or below a threshold value and/or less than the number of inferences received by a second machine learning model variant. In embodiments in which the quality metric is a confidence level, there can be an issue if the confidence level of the first machine learning model is below a threshold value and/or less than the confidence level of a second machine learning model variant. If there is an issue with the quality metric, the machine learning model accuracy improvement routine 800 proceeds to block 812. Otherwise, if there is no issue with the quality metric, the machine learning model accuracy improvement routine 800 either proceeds to block 814 or ends, as shown at block 818 (e.g., no changes are made to the network traffic weights).

At block 812, in some embodiments, an adjusted traffic routing is determined in which inferences are transmitted to the first machine learning model variant less often. For example, the network traffic weights in the mapping data structure corresponding to the first machine learning model variant can be adjusted such that the first machine learning model variant is assigned a network traffic weight that is at least less than the network traffic weight assigned to the second machine learning model variant. Once the adjusted traffic routing is determined, the machine learning model accuracy improvement routine 800 proceeds to block 816.

At block 814, in some embodiments, an adjusted traffic routing is determined in which inferences are transmitted to the first machine learning model variant more often. For example, the network traffic weights in the mapping data structure corresponding to the first machine learning model variant can be adjusted such that the first machine learning model variant is assigned a network traffic weight that is at least greater than the network traffic weights assigned to other machine learning model variants that have a worse quality metric.

At block 816, in some embodiments, a mapping associated with the first machine learning model variant is updated using the adjusted traffic routing. For example, the mapping is updated to include the adjusted network traffic weights. After the mapping is updated, the machine learning model accuracy improvement routine 800 ends, as shown at block 818.

Example Architecture of Inference Routing System

Figure 9:
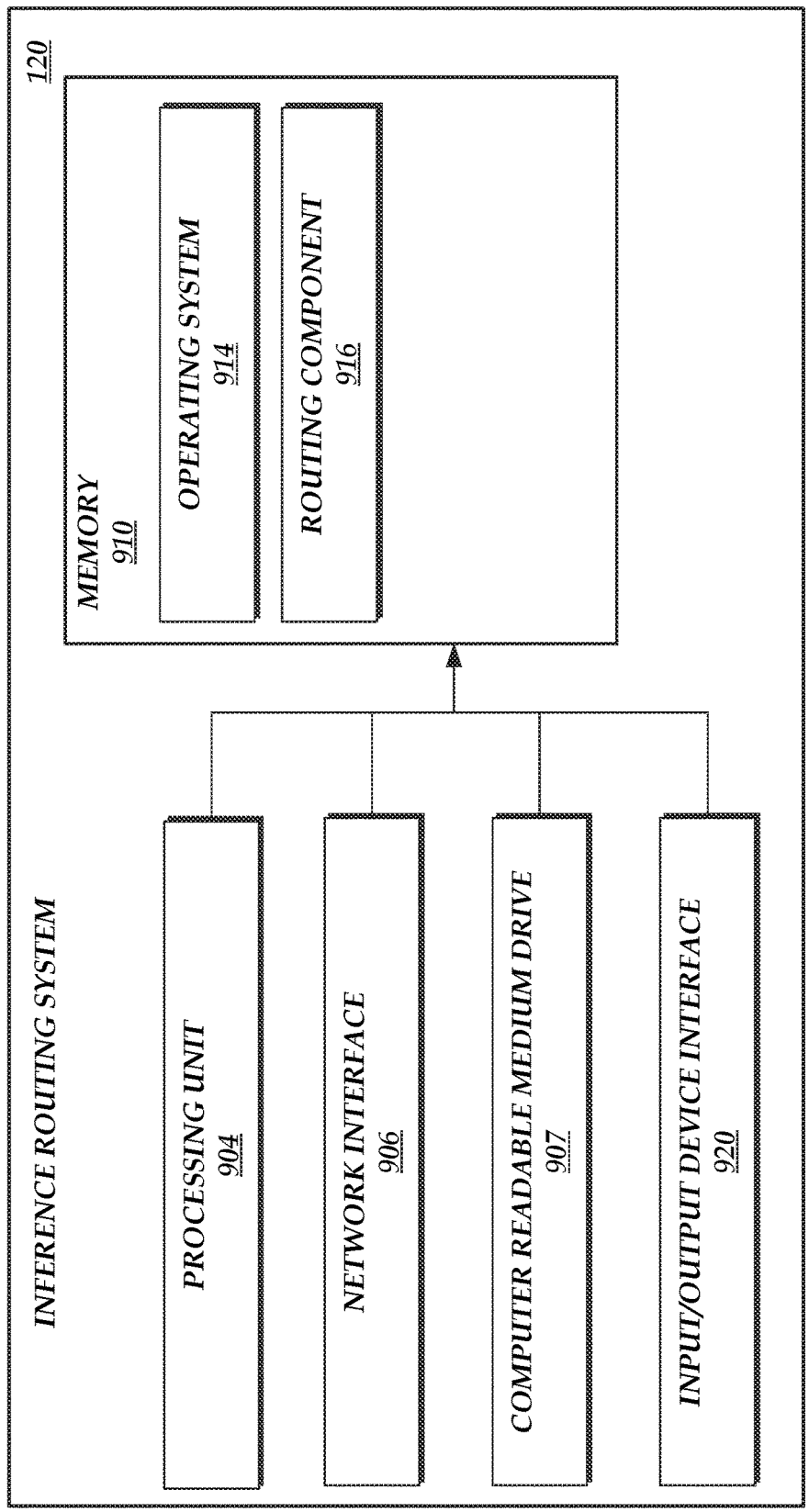
FIG. 9 depicts some embodiments of an architecture of an illustrative inference routing system, such as the inference routing system, that routes inferences and updates inference routing in accordance with the present application.

FIG. 9 depicts some embodiments of an architecture of an illustrative inference routing system, such as the inference routing system 120, that routes inferences and updates inference routing in accordance with the present application. The general architecture of the inference routing system 120 depicted in FIG. 9 includes an arrangement of computer hardware and software components that can be used to implement aspects of the present disclosure. As illustrated, the inference routing system 120 includes a processing unit 904, a network interface 906, a computer-readable medium drive 907, an input/output device interface 920, all of which may communicate with one another by way of a communication bus.

In some embodiments, the network interface 906 provides connectivity to one or more networks or computing systems, such as the network 110 of FIG. 1. The processing unit 904 can thus receive information and instructions from other computing systems or services via a network. The processing unit 904 can also communicate to and from memory 910 and further provide output information. In some embodiments, the inference routing system 120 includes more (or fewer) components than those shown in FIG. 9.

In some embodiments, the memory 910 includes computer program instructions that the processing unit 904 executes in order to implement one or more embodiments. The memory 910 generally includes RAM, ROM, or other persistent or non-transitory memory. The memory 910 can store an operating system 914 that provides computer program instructions for use by the processing unit 904 in the general administration and operation of the functionality implemented by the inference routing system 120. The memory 910 can further include computer program instructions and other information for implementing aspects of the present disclosure. For example, in some embodiments, the memory 910 includes a routing component 916 that corresponds to functionality provided by the inference routing system 120 illustrated in FIG. 1.

Example Architecture of Model Hosting System

Figure 10:
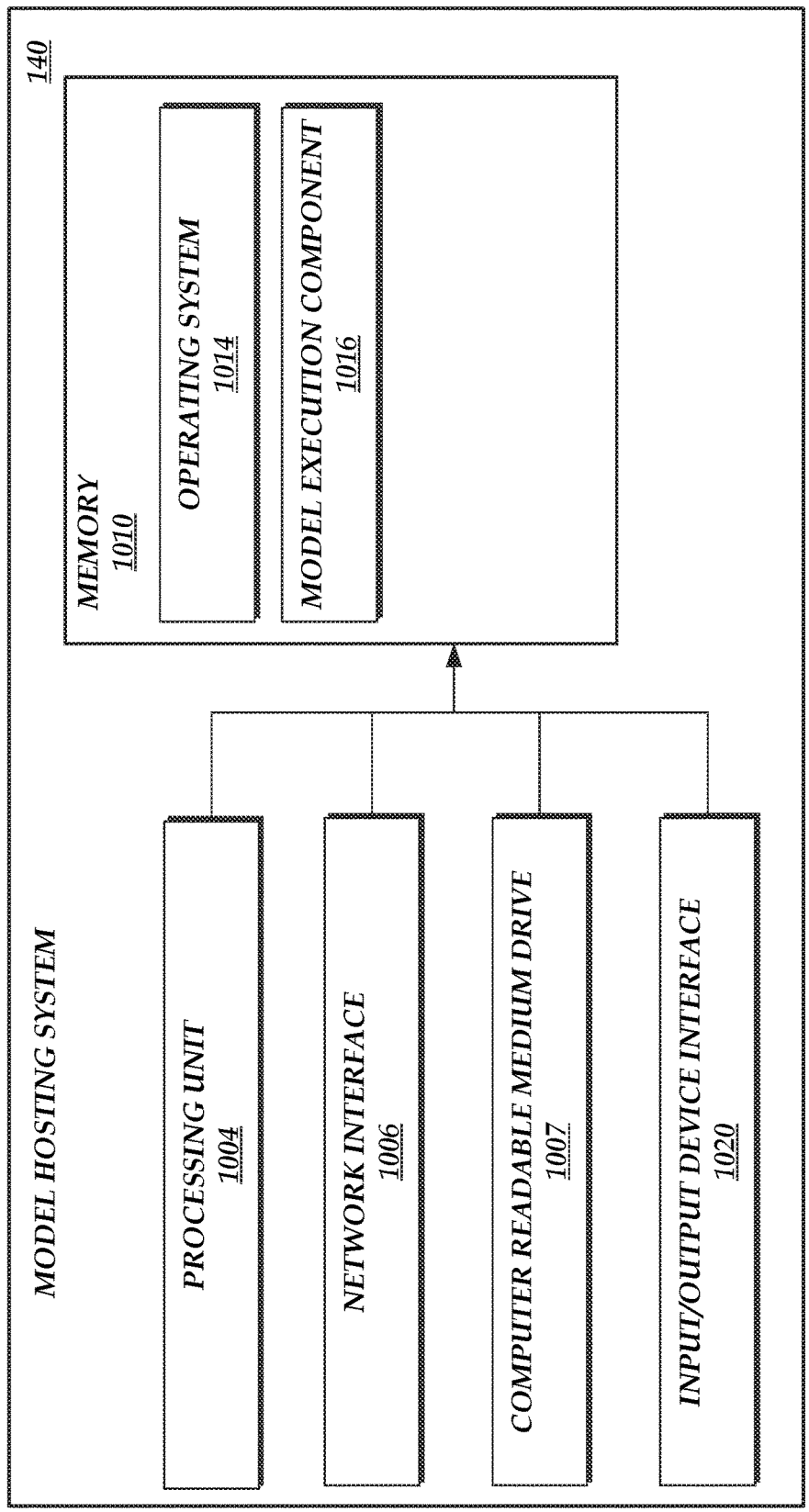
FIG. 10 depicts some embodiments of an architecture of an illustrative model hosting system, such as the model hosting system, that hosts machine learning models in accordance with the present application.

FIG. 10 depicts some embodiments of an architecture of an illustrative model hosting system, such as the model hosting system 140, that hosts machine learning models in accordance with the present application. The general architecture of the model hosting system 140 depicted in FIG. 10 includes an arrangement of computer hardware and software components that can be used to implement aspects of the present disclosure. As illustrated, the model hosting system 140 includes a processing unit 1004, a network interface 1006, a computer-readable medium drive 1007, an input/output device interface 1020, all of which may communicate with one another by way of a communication bus.

In some embodiments, the network interface 1006 provides connectivity to one or more networks or computing systems, such as the network 110 of FIG. 1. The processing unit 1004 can thus receive information and instructions from other computing systems or services via a network. The processing unit 1004 can also communicate to and from memory 1010 and further provide output information. In some embodiments, the model hosting system 140 includes more (or fewer) components than those shown in FIG. 10.

In some embodiments, the memory 1010 includes computer program instructions that the processing unit 1004 executes in order to implement one or more embodiments. The memory 1010 generally includes RAM, ROM, or other persistent or non-transitory memory. The memory 1010 can store an operating system 1014 that provides computer program instructions for use by the processing unit 1004 in the general administration and operation of the functionality implemented by the model hosting system 140. The memory 1010 can further include computer program instructions and other information for implementing aspects of the present disclosure. For example, in some embodiments, the memory 1010 includes a model execution component 1016 that corresponds to functionality provided by the model hosting system 140.

Example Architecture of an End User Device

Figure 11:
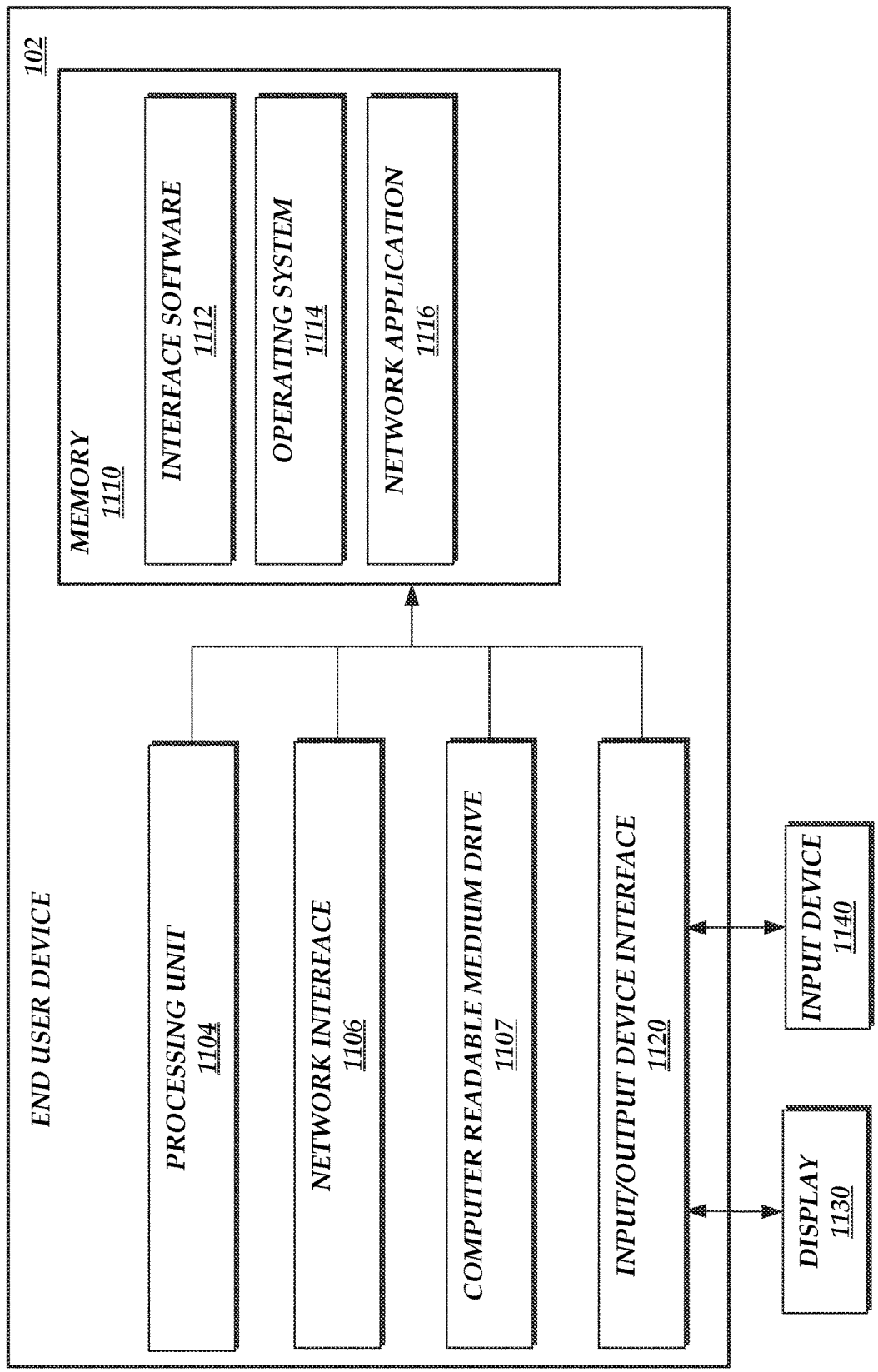
FIG. 11 depicts some embodiments of an architecture of an illustrative end user device that can receive data, prepare data, and transmit inferences to the model hosting system in accordance with the present application.

FIG. 11 depicts some embodiments of an architecture of an illustrative end user device 102 that can receive data, prepare data, and transmit inferences to the model hosting system 140 in accordance with the present application. The general architecture of the end user device 102 depicted in FIG. 11 includes an arrangement of computer hardware and software components that can be used to implement and access aspects of the present disclosure. As illustrated, the end user device 102 includes a processing unit 1104, a network interface 1106, a computer readable medium drive 1107, an input/output device interface 1120, an optional display 1130, and an input device 1140, all of which may communicate with one another by way of a communication bus.

In some embodiments, the network interface 1106 provides connectivity to one or more networks or computing systems, such as the network 110 of FIG. 1. The processing unit 1104 can thus receive information and instructions from other computing systems or services via a network. The processing unit 1104 can also communicate to and from memory 1110 and further provide output information for the optional display 1130 via the input/output device interface 1120. The input/output device interface 1120 can also accept input from the optional input device 1140, such as a keyboard, mouse, digital pen, touchscreen, etc. In some embodiments, the end user devices 102 include more (or fewer) components than those shown in FIG. 11.

In some embodiments, the memory 1110 includes computer program instructions that the processing unit 1104 executes in order to receive data, prepare data, and transmit the requests described herein. The memory 1110 generally includes RAM, ROM, or other persistent or non-transitory memory. The memory 1110 can store an operating system 1114 that provides computer program instructions and interface software 1112 for use by the processing unit 1104 in the general administration and operation of the end user device 102. The memory 1110 can further include computer program instructions and other information for implementing aspects of the present disclosure. For example, in some embodiments, the memory 1110 includes a network application 1116, such as browser application, media player, CLI, stand-alone application, etc., for accessing content and communicating with the model hosting system 140.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In some embodiments, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while some embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for routing machine learning model inferences, the system comprising:
   a first computing device to host a first virtual machine instance, the first virtual machine instance to execute a first initialized operating system and code stored within a first machine learning container that defines a first machine learning model in a plurality of machine learning models; and
   a network traffic router comprising a processor and a cache, the network traffic router comprising computer-executable instructions, which if performed by the processor, cause the network traffic router to:
      obtain an inference originating from a user device, wherein the inference comprises input data;
      determine that one or more network traffic weights that indicate an historical accuracy of the plurality of machine learning models are not stored in the cache;
      retrieve the one or more network traffic weights from an endpoint registry;
      select the first machine learning model to receive the inference based at least in part on a difference between a number of inferences routed to the first machine learning model and a number of inferences expected to be routed to the first machine learning model as indicated by the one or more network traffic weights;
      identify a first network address associated with the first machine learning model; and
      route the inference to the first network address, wherein routing the inference to the first network address causes the first virtual machine instance to execute the code stored within the first machine learning container using the input data.

2. The system of claim 1, further comprising a feedback processing system comprising a second processor and second computer-executable instructions, which if performed by the second processor, cause the feedback processing system to:
   obtain a predicted result generated by the first machine learning container;
   obtain an actual result produced in response to the input data; and
   determine a quality metric of the first machine learning model based on a difference between the predicted result and the actual result.

3. The system of claim 2, further comprising the endpoint registry, wherein the endpoint registry comprises a third processor and third computer-executable instructions, which if performed by the third processor, cause the endpoint registry to:
   determine that the quality metric of the first machine learning model is worse than a quality metric of a second machine learning model in the plurality of machine learning models;
   determine that a first network traffic weight in the one or more network traffic weights associated with the first machine learning model is greater than a second network traffic weight in the one or more network traffic weights associated with the second machine learning model; and
   modify at least one of the first network traffic weight or the second network traffic weight such that the first network traffic weight is less than the second network traffic weight.

4. The system of claim 2, wherein the first machine learning model is tuned using a first hyperparameter, and wherein the second computer-executable instructions further cause the feedback processing system to:
   determine a modification to the first hyperparameter using the quality metric; and
   initialize a shadow machine learning container that includes third executable instructions that define a second machine learning model tuned using the modification to the first hyperparameter,
   the shadow machine learning container initialized within a test environment.

5. The system of claim 1, wherein the computer-executable instructions further cause the network traffic router to:
   encrypt the inference to form an encrypted inference; and
   route the encrypted inference to the first network address.

6. A computer-implemented method comprising:
   obtaining an inference originating from a user device;
   selecting a first machine learning model in a plurality of machine learning models to receive the inference based at least in part on a difference between a number of inferences routed to the first machine learning model and a number of inferences expected to be routed to the first machine learning model as indicated by one or more network traffic weights that indicate an historical accuracy of the plurality of machine learning models, wherein one or more virtual machine instances hosted in a computing device are configured to execute the plurality of machine learning models;
   identifying a first network address associated with the first machine learning model; and
   routing the inference to the first network address.

7. The computer-implemented method of claim 6, wherein routing the inference to the first network address causes a first virtual machine instance in the one or more virtual machine instances to execute code stored within a first machine learning container initialized in the first virtual machine instance using input data comprised within the inference to generate a first predicted result.

8. The computer-implemented method of claim 7, the first virtual machine instance to route the inference to a second machine learning container initialized in the first virtual machine instance, the first virtual machine instance to execute second code stored within the second machine learning container using the input data to generate a second predicted result, the first virtual machine instance to aggregate the first predicted result and the second predicted result.

9. The computer-implemented method of claim 8, wherein the plurality of machine learning models form an ensemble machine learning model.

10. The computer-implemented method of claim 7, the first virtual machine instance to route the inference and the first predicted result to a shadow virtual machine instance hosted by a second computing device, the shadow virtual machine instance to execute second code stored within a shadow machine learning container using the input data to generate a second predicted result, the shadow virtual machine instance to store at least one of the first predicted result or the second predicted predict result in response to a determination that the first predicted result and the second predicted result do not match.

11. The computer-implemented method of claim 6, further comprising:
   obtaining a predicted result generated by the first machine learning model;
   obtaining an actual result produced in response to input data that resulted in the predicted result; and
   determining a quality metric of the first machine learning model based on a difference between the predicted result and the actual result.

12. The computer-implemented method of claim 11, further comprising:
   determining that the quality metric of the first machine learning model is worse than a quality metric of a second machine learning model in the plurality of machine learning models;
   determining that a first network traffic weight in the one or more network traffic weights associated with the first machine learning model is greater than a second network traffic weight in the one or more network traffic weights associated with the second machine learning model; and
   modifying at least one of the first network traffic weight or the second network traffic weight such that the first network traffic weight is less than the second network traffic weight.

13. The computer-implemented method of claim 11, wherein the first machine learning model is tuned using a first hyperparameter, and wherein the computer-implemented method further comprises:
   determining a modification to the first hyperparameter using the quality metric; and
   initializing a shadow machine learning container that includes executable instructions that define a second machine learning model tuned using the modification to the first hyperparameter,
   the shadow machine learning container initialized within a test environment.

14. The computer-implemented method of claim 6, wherein routing the inference to the first network address further comprises:
   encrypting the inference to form an encrypted inference; and
   routing the encrypted inference to the first network address.

15. The computer-implemented method of claim 6, further comprising retrieving the one or more network traffic weights from one of a cache local to a network traffic router or an endpoint registry.

16. One or more non-transitory, computer-readable storage media comprising computer-executable instructions, which if performed by one or more processors, cause the one or more processors to at least:
   obtain a machine learning model input;
   select a first machine learning model of a plurality of machine learning models based at least in part on a difference between a number of inferences routed to the first machine learning model and a number of inferences expected to be routed to the first machine learning model as indicated by a historical accuracy associated with the first machine learning model, wherein one or more virtual machine instances hosted in a computing device are configured to execute the plurality of machine learning models;
   identify a first network address associated with the first machine learning model; and
   route the machine learning model input to the first network address.

17. The non-transitory, computer-readable storage media of claim 16, wherein reception of the machine learning model input routed to the first network address causes a first virtual machine instance in the one or more virtual machine instances to execute code stored within a first machine learning container initialized in the first virtual machine instance using the machine learning model input.

18. The non-transitory, computer-readable storage media of claim 16, wherein the computer-executable instructions further cause the one or more processors to at least:
   obtain a predicted result generated by the first machine learning model;
   obtain an actual result produced in response to input data that resulted in the predicted result; and
   determine a quality metric of the first machine learning model based on a difference between the predicted result and the actual result.

19. The non-transitory, computer-readable storage media of claim 18, wherein the computer-executable instructions further cause the one or more processors to at least:
   determine that the quality metric of the first machine learning model is worse than a quality metric of a second machine learning model in the plurality of machine learning models;
   determine that more machine learning model inputs are routed to the first machine learning model than to the second machine learning model; and
   modify the routing of machine learning model inputs such that more machine learning model inputs are routed to the second machine learning model than the first machine learning model.

20. The non-transitory, computer-readable storage media of claim 16, wherein the computer-executable instructions further cause the one or more processors to at least:
   obtain an encrypted machine learning model input prior to selection of the first machine learning model;
   decrypt the encrypted machine learning model input prior to selection of the first machine learning model;
   re-encrypt the machine learning model input to form a re-encrypted machine learning model input after identification of the first network address; and
   route the re-encrypted machine learning model input to the first network address.

* * * * *